(12) United States Patent
Shao

(10) Patent No.: US 11,848,808 B2
(45) Date of Patent: Dec. 19, 2023

(54) INFORMATION PROCESSING METHOD AND COMMUNICATIONS APPARATUS

(71) Applicant: HUAWEI TECHNOLOGIES CO., LTD., Guangdong (CN)

(72) Inventor: Jiafeng Shao, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 465 days.

(21) Appl. No.: 17/170,330

(22) Filed: Feb. 8, 2021

(65) Prior Publication Data
US 2021/0168007 A1 Jun. 3, 2021

Related U.S. Application Data

(63) Continuation of application No. PCT/CN2019/099505, filed on Aug. 6, 2019.

(30) Foreign Application Priority Data

Aug. 9, 2018 (CN) .......................... 201810903314.0

(51) Int. Cl.
H04L 27/26 (2006.01)
H04L 5/00 (2006.01)
(Continued)

(52) U.S. Cl.
CPC ........ H04L 27/2613 (2013.01); H04L 5/0012 (2013.01); H04L 5/0048 (2013.01);
(Continued)

(58) Field of Classification Search
CPC ... H04L 27/2613; H04L 5/001; H04L 5/0012; H04L 5/0048; H04L 5/0051;
(Continued)

(56) References Cited

U.S. PATENT DOCUMENTS 9,609,647 B2 * 3/2017 You ................. H04L 5/0051
11,637,672 B2 * 4/2023 Saito ............... H04L 5/0094
370/329
(Continued)

FOREIGN PATENT DOCUMENTS

CN 104471877 A 3/2015
CN 105281880 A 1/2016
(Continued)

OTHER PUBLICATIONS

Vivo,"Multiplexing data with different transmission durations",3GPP TSG RAN WG1 Meeting 90bis R1-1717502, Prague, CZ, Oct. 9-13, 2017, Total 10 Pages.
(Continued)

Primary Examiner — Robert J Lopata
(74) Attorney, Agent, or Firm — WOMBLE BOND DICKINSON (US) LLP

(57) ABSTRACT

This application provides an information processing method and a communications apparatus. In embodiments of this application, when a time-frequency resource, for a first DMRS, indicated by first information overlaps a time-frequency resource, for a second DMRS, indicated by second information, but another parameter indicated by the first information is different from that indicated by the second information, a terminal device may discard the second information, to avoid a behavior error or behavior unpredictability of the terminal device. A parameter indicated by each of the first information and the second information includes at least one of the following parameters: bandwidth part indication information, antenna port information, and DMRS sequence initialization information.

20 Claims, 5 Drawing Sheets

(51) Int. Cl.
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01)

(58) Field of Classification Search
  CPC ............ H04L 5/0094; H04W 72/0446; H04W 72/0453; H04W 72/23
  USPC ......................................................... 370/329
  See application file for complete search history.

(56) References Cited

U.S. PATENT DOCUMENTS

| | | | |
|---|---|---|---|
| 11,677,602 B2* | 6/2023 | Fu | H04L 5/0094 370/329 |
| 2014/0204853 A1 | 7/2014 | Ko et al. | |
| 2014/0321406 A1 | 10/2014 | Marinier et al. | |
| 2014/0321421 A1* | 10/2014 | Popovic | H04L 5/0048 370/330 |
| 2015/0358924 A1 | 12/2015 | Papasakellariou | |
| 2018/0019843 A1 | 1/2018 | Papasakellariou | |
| 2020/0059337 A1* | 2/2020 | Yamada | H04L 27/2613 |
| 2020/0145173 A1* | 5/2020 | Lyu | H04L 1/1858 |
| 2020/0145174 A1* | 5/2020 | Liang | H04L 5/0051 |
| 2020/0229156 A1* | 7/2020 | Park | H04L 5/0094 |
| 2020/0266946 A1* | 8/2020 | Kim | H04L 5/0051 |
| 2021/0091915 A1* | 3/2021 | Khoshnevisan | H04L 5/0094 |
| 2021/0219278 A1* | 7/2021 | Hu | H04W 72/1268 |
| 2021/0314955 A1* | 10/2021 | Zhang | H04L 5/0053 |

FOREIGN PATENT DOCUMENTS

| | | |
|---|---|---|
| CN | 107040354 A | 8/2017 |
| CN | 107205275 A | 9/2017 |
| CN | 107248905 A | 10/2017 |
| CN | 107733563 A | 2/2018 |
| CN | 107769825 A | 3/2018 |
| CN | 107926023 B | 12/2020 |
| WO | 2011093670 A2 | 8/2011 |
| WO | 2014113971 A1 | 7/2014 |
| WO | 2017133709 A1 | 8/2017 |
| WO | 2017171314 A1 | 10/2017 |
| WO | 2018026181 A1 | 2/2018 |

OTHER PUBLICATIONS

ZTE et al.,"Remaining issues on DMRS",3GPP TSG RAN WG1 Meeting #92bis R1-1803911,Sanya, China, Apr. 16-20, 2018, Total 6 Pages.

3GPP TS 38.211 V15.2.0 (Jun. 2018);3rd Generation Partnership Project; Technical Specification Group Radio Access Network;NR;Physical channels and modulation(Release 15);total 96 pages.

3GPP TS 38.212 V15.2.0 (Jun. 2018);3rd Generation Partnership Project; Technical Specification Group Radio Access Network;NR;Multiplexing and channel coding(Release 15);total 98 pages.

OPPO, Remaining issues on transmission collision. 3GPP TSG RAN WG 1 Meeting AH 1801, Vancouver, Canada, Jan. 22-26, 2018, R1-1800512, 3 pages.

Vivo, Remaining details on DMRS design. 3GPP TSG RAN WG1 Meeting#90bis, Prague, CZ, Oct. 9-13, 2017, R1-1717477, 10 pages.

* cited by examiner

INFORMATION PROCESSING METHOD AND COMMUNICATIONS APPARATUS

CROSS-REFERENCE TO RELATED APPLICATIONS

This application is a continuation of International Application No. PCT/CN2019/099505, filed on Aug. 6, 2019, which claims priority to Chinese Patent Application No. 201810903314.0, filed on Aug. 9, 2018. The disclosures of the aforementioned applications are hereby incorporated by reference in their entireties.

TECHNICAL FIELD

This application relates to the communications field, and more specifically, to an information processing method and a communications apparatus in the communications field.

BACKGROUND

In a wireless communications system, a reference signal (RS) needs to be transmitted in an uplink information transmission process or a downlink information transmission process, and channel estimation is performed by using the reference signal, to demodulate and decode information by using a result of the channel estimation.

A more flexible and more complex resource scheduling manner is introduced into new radio (NR) in a 5th generation (5G) mobile communications system. Therefore, in 5G NR, a plurality of pieces of information may indicate a reference signal. In this case, how a terminal device processes the plurality of pieces of information is a problem to be urgently resolved.

SUMMARY

This application provides an information processing method and a communications apparatus, to discard second information when first information is inconsistent with the second information, thereby improving demodulation performance on a channel.

According to a first aspect, an information processing method is provided, and includes:
  receiving first information, where the first information is used to indicate a time-frequency resource for a first demodulation reference signal DMRS;
  receiving second information, where the second information is used to indicate a time-frequency resource for a second DMRS, the time-frequency resource for the second DMRS completely or partially overlaps the time-frequency resource for the first DMRS, and the first information includes first downlink control information DCI and the second information includes second DCI, or the first information includes first configuration information and the second information includes second DCI, or the first information includes first DCI and the second information includes second configuration information, where both the first configuration information and the second configuration information are higher layer signaling; and
  discarding the second information when a first condition is met, where the first condition includes at least one of the following conditions:
  bandwidth part indication information indicated by the second information is different from bandwidth part indication information indicated by the first information;
  antenna port information indicated by the second information is different from antenna port information indicated by the first information; and
  DMRS sequence initialization information indicated by the second information is different from DMRS sequence initialization information indicated by the first information.

In this embodiment of this application, when the first information and the second information meet the first condition, if a terminal device transmits the DMRSs based on indications of the first information and the second information, a behavior error of the terminal device is caused, and further, demodulation performance on a channel is reduced or a demodulation error on a channel is caused. In this case, the terminal device may discard the second information and comply with the indication of the first information, thereby improving the demodulation performance on the channel. Further, when the first information is inconsistent with the second information, the second information is discarded, so that a DMRS, corresponding to a first channel, indicated by the first information can be used to demodulate information, on a second channel, indicated by the second information, and the DMRS corresponding to the first channel is shared with the second channel. Therefore, performance of demodulation on the second channel is not affected.

Optionally, the terminal device reports that a capability of transmitting two or more DMRSs is not supported, where the two or more DMRSs overlap in time domain.

Optionally, the terminal device receives higher layer signaling sent by a network device, and is configured not to be capable of transmitting two or more DMRSs, where the two or more DMRSs overlap in time domain. Optionally, herein, the terminal device may report that a capability of transmitting two or more DMRSs is supported. Frequency domain resources for the two or more DMRSs are in one serving cell, or in one bandwidth part, or in a plurality of bandwidth parts of one serving cell, or on different uplinks. The uplink herein may alternatively be a supplementary uplink.

With reference to the first aspect, in some implementations of the first aspect, the first information includes the first DCI, the second information includes the second DCI, and a DCI format identifier in each of the first DCI and the second DCI is 0; or
  the first information includes the first configuration information, the second information includes the second DCI, a DCI format identifier in the second DCI is 0, and the first configuration information is used to configure uplink transmission without dynamic grant; or
  the second information includes the second configuration information, the first information includes the first DCI, a DCI format identifier in the first DCI is 0, and the second configuration information is used to configure uplink transmission without dynamic grant.

Herein, that a DCI format identifier of DCI is set to 0 indicates that the DCI is used to indicate transmission of uplink information.

With reference to the first aspect, in some implementations of the first aspect, the first condition further includes at least one of the following conditions:
  uplink indication information and supplementary uplink indication information that are indicated by the second information are different from uplink indication information and supplementary uplink indication information that are indicated by the first information;

frequency hopping information indicated by the second information is different from frequency hopping information indicated by the first information;

a phase-tracking reference signal PTRS-demodulation reference signal DMRS association indicated by the second information is different from a PTRS-DMRS association indicated by the first information;

closed-loop power control indication information indicated by the second information is different from closed-loop power control indication information indicated by the first information; and transform precoder information indicated by the second information is different from transform precoder information indicated by the first information.

With reference to the first aspect, in some implementations of the first aspect, the first information is further used to indicate a time domain resource for a first channel, the second information is further used to indicate a time domain resource for a second channel, and the method further includes:

sending a third channel, where the third channel is used to carry configured grant-based uplink transmission, where the first condition further includes at least one of the following conditions:

a time domain resource for the third channel is between the time domain resource for the first channel and the time domain resource for the second channel;

the time domain resource for the third channel partially or completely overlaps the time domain resource for the first channel; and the time domain resource for the third channel partially or completely overlaps the time domain resource for the second channel.

When the third channel meets the foregoing condition, uplink transmit power of the terminal device may change. Consequently, uplink transmit power of the terminal device on the first channel is different from uplink transmit power of the terminal device on the second channel, and a same DMRS cannot be used for demodulation on the first channel and the second channel, that is, the DMRS cannot be shared.

Optionally, when the first channel and the second channel are uplink channels, the method may further include: receiving, by the terminal device, a fifth channel, where the fifth channel is used to carry semi-persistent scheduling-based downlink information, or is used to carry scheduling-based downlink information.

The first condition further includes at least one of the following conditions:

a time domain resource for the fifth channel is between the time domain resource for the first channel and the time domain resource for the second channel;

the time domain resource for the fifth channel overlaps the time domain resource for the first channel; and the time domain resource for the fifth channel overlaps the time domain resource for the second channel.

When the fifth channel meets the foregoing condition, uplink transmit power of the terminal device on the first channel is different from uplink transmit power of the terminal device on the second channel, and a same DMRS cannot be used for demodulation on the first channel and the second channel, that is, the DMRS cannot be shared.

With reference to the first aspect, in some implementations of the first aspect, the first condition further includes at least one of the following conditions:

the terminal device is configured to be in a transmit power command accumulation mode, and a transmit power command word indicated by the second information is not 1; and the terminal device is configured to be in a non-transmit power command accumulation mode, and a transmit power command word indicated by the second information is different from a transmit power command word indicated by the first information.

With reference to the first aspect, in some implementations of the first aspect, the first information includes the first DCI, the second information includes the second DCI, and a DCI format identifier in each of the first DCI and the second DCI is 1; or the first information includes the first configuration information, the second information includes the second DCI, a DCI format identifier in the second DCI is 1, and the first configuration information is used to configure semi-persistent scheduling-based downlink transmission; or the second information includes the second configuration information, the first information includes the first DCI, a DCI format identifier in the first DCI is 1, and the second configuration information is used to configure semi-persistent scheduling-based downlink transmission.

It should be noted that a DCI format identifier of DCI is 1 indicates that the DCI is used to indicate transmission of downlink information.

With reference to the first aspect, in some implementations of the first aspect, the first condition further includes at least one of the following conditions:

transmission configuration indication information indicated by the second information is different from transmission configuration indication information indicated by the first information;

physical resource block bundling size indicator information indicated by the second information is different from physical resource block bundling size indicator information indicated by the first information; and frequency hopping information indicated by the second information is different from frequency hopping information indicated by the first information.

With reference to the first aspect, in some implementations of the first aspect, the first information is further used to indicate a time domain resource for a first channel, the second information is further used to indicate a time domain resource for a second channel, and the method further includes:

receiving a fourth channel, where the fourth channel is used to carry semi-persistent scheduling-based downlink information, where the first condition further includes at least one of the following conditions:

a time domain resource for the fourth channel is between the time domain resource for the first channel and the time domain resource for the second channel;

the time domain resource for the fourth channel partially or completely overlaps the time domain resource for the first channel; and the time domain resource for the fourth channel partially or completely overlaps the time domain resource for the second channel.

When the fourth channel meets the foregoing condition, downlink transmit power of the network device may change. Consequently, downlink transmit power of the network device on the first channel is different from downlink transmit power of the network device on the second channel, and a same DMRS cannot be used for demodulation on the first channel and the second channel, that is, the DMRS cannot be shared.

Optionally, when the first channel and the second channel are downlink channels, the method may further include: sending, by the terminal device, a sixth channel, where the sixth channel is used to carry configured grant-based uplink information, or is used to carry scheduling-based uplink information. In this case, the first condition further includes at least one of the following conditions:

a time domain resource for the sixth channel is between the time domain resource for the first channel and the time domain resource for the second channel;

the time domain resource for the sixth channel overlaps the time domain resource for the first channel; and the time domain resource for the sixth channel overlaps the time domain resource for the second channel.

When the sixth channel meets the foregoing condition, downlink transmit power of the network device may change. Consequently, downlink transmit power of the network device on the first channel is different from downlink transmit power of the network device on the second channel, and a same DMRS cannot be used for demodulation on the first channel and the second channel, that is, the DMRS cannot be shared.

With reference to the first aspect, in some implementations of the first aspect, the first information includes the first DCI, the second information includes the second DCI, and the first condition further includes at least one of the following conditions:

the first DCI is scrambled by using a first radio network temporary identifier RNTI, the second DCI is scrambled by using a second RNTI, and the first RNTI is different from the second RNTI;

a format of the first DCI is a first format, a format of the second DCI is a second format, and the first format is different from the second format;

search space in which the first DCI is located is first search space, search space in which the second DCI is located is second search space, and the first search space is different from the second search space; and a physical downlink control channel PDCCH monitoring periodicity corresponding to the first DCI is a first PDCCH monitoring periodicity, a PDCCH monitoring periodicity corresponding to the second DCI is a second PDCCH monitoring periodicity, and the first PDCCH monitoring periodicity is different from the second PDCCH monitoring periodicity.

It should be noted that, when DCI transmitted twice is different in terms of at least one of a scrambling manner, a format, search space in which the DCI is located, or a monitoring periodicity, it may be considered that content, formats, or purposes indicated in the DCI transmitted twice is/are different. In this case, it may further be considered that DMRS information transmitted twice is different.

With reference to the first aspect, in some implementations of the first aspect, the second information includes the second DCI, and the first condition further includes at least one of the following conditions:

the second DCI is scrambled by using a second radio network temporary identifier RNTI;

a format of the second DCI is a second format;

search space in which the second DCI is located is second search space; and a physical downlink control channel PDCCH monitoring periodicity corresponding to the second DCI is a second PDCCH monitoring periodicity.

In other words, in this case, the terminal device may determine, based on an attribute of the second information instead of an attribute of the first information, whether to discard the second information.

Therefore, in this embodiment of this application, when the first information is inconsistent with the second information, service transmission in some specific services or use scenarios (for example, an eMBB service or a low-speed scenario) may be discarded, to meet an information transmission requirement of another specific service or use scenario (for example, a URLLC service or a high-speed scenario).

In this embodiment of this application, a slot in which the last symbol or the first symbol of the first DMRS is located is defined as a first slot, a slot in which the time domain resource for the first channel is located is a second slot, and a slot in which the time domain resource for the second channel is located is a third slot.

Optionally, a distance between a start moment of the first slot and a start moment of the second slot is less than or equal to 14*B1 symbols, or is less than or equal to 3*(a subcarrier spacing index+1) slots; or a distance between a start moment of a time domain resource for the first DMRS and a start moment of the time domain resource for the first channel is less than or equal to B2 symbols, so that an interval between the first DMRS and the first channel is relatively small. In this way, a channel status obtained by a receive end by performing channel estimation by using the first DMRS is more approximate to an actual channel status of the first channel, so that performance of demodulation on the first channel can be improved at the receive end.

Optionally, a distance between a start moment of the second slot and a start moment of the third slot is less than or equal to 14*B3 symbols, or is less than or equal to 3*(a subcarrier spacing index+1) slots; or a distance between a start moment of the time domain resource for the first channel and a start moment of the time domain resource for the second channel is less than or equal to B4 symbols, so that a same DMRS can be used for the first channel and the second channel for channel estimation.

With reference to the first aspect, in some implementations of the first aspect, the second information is received after the first information is received.

With reference to the first aspect, in some implementations of the first aspect, the first condition further includes at least one of the following conditions:

precoding information and quantity-of-layers information that are indicated by the second information are different from precoding information and quantity-of-layers information that are indicated by the first information; and the first information is further used to indicate a time-frequency resource for the first channel, the second information is further used to indicate a time-frequency resource for the second channel, and a frequency domain resource, for the second channel, indicated by the second information is different from a frequency domain resource, for the first channel, indicated by the first information.

According to a second aspect, a communications apparatus is provided, and the communications apparatus is configured to perform the method according to any one of the first aspect or the possible implementations of the first aspect. The communications apparatus may include a module configured to perform the method according to any one of the first aspect or the possible implementations of the first aspect.

According to a third aspect, a communications apparatus is provided. The communications apparatus includes a processor, the processor is connected to a memory, the memory is configured to store an instruction, and the processor is configured to execute the instruction stored in the memory, and performs the method according to any one of the first aspect or the possible implementations of the first aspect by executing the instruction stored in the memory.

According to a fourth aspect, a computer-readable storage medium is provided. The computer-readable storage medium stores an instruction, and when the instruction is run on a computer, the computer is enabled to perform the method according to any one of the first aspect or the possible implementations of the first aspect.

According to a fifth aspect, a computer program product is provided. The computer program product includes a computer program, and when the computer program is run, the method according to any one of the first aspect or the possible implementations of the first aspect is implemented.

DESCRIPTION OF EMBODIMENTS

The following describes technical solutions of this application with reference to the accompanying drawings.

Figure 1:
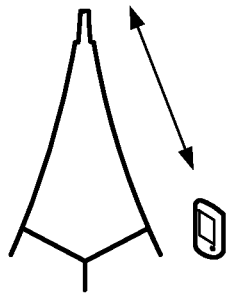
FIG. 1 is a schematic architectural diagram of a mobile communications system in which an embodiment of this application is used.

FIG. 1 is a schematic architectural diagram of a mobile communications system in which an embodiment of this application is used. As shown in FIG. 1, the mobile communications system includes a network device 101 and a terminal device 102. In this embodiment of this application, the mobile communications system may be a long term evolution (LTE) system, a Wi-Fi system, a 5th generation (5G) mobile communications system, or a future evolved mobile communications system. The mobile communications system used in this embodiment is not limited in this application.

The terminal device 102 in this embodiment of this application may also be referred to as a terminal, user equipment (UE), a mobile station (MS), a mobile terminal (MT), and the like. The terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in a remote surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

In this embodiment of this application, the network device 101 is an apparatus that is deployed in a radio access network and that is configured to provide a wireless communication function for the terminal device. The network device may include base stations in various forms, such as a macro base station, a micro base station (also referred to as a small cell), a relay station, an access point, a new radio controller (NR controller), a centralized unit, a remote radio unit, a distributed unit, a transmission reception point (TRP), a transmission point (TP), or any other radio access device, but the embodiments of this application are not limited thereto. In systems using different radio access technologies, a device with a base station function may have different names. For example, the network device may be an access point (AP) in a wireless local area network (WLAN), an evolved NodeB (eNB or eNodeB) in an LTE system, a next generation NodeB (gNB) in a 5G mobile communications system, or a base station in a future mobile communications system. A specific technology and a specific device form used by the radio access network device are not limited in the embodiments of this application.

In the embodiments of this application, the term "time-frequency resource" may be understood as "a time domain resource and/or a frequency domain resource". The time domain resource may be one or more symbols, or one or more slots. The frequency domain resource may be one or more resource blocks (RB), one or more resource elements (RE), one or more carriers, one or more cells, or one or more bandwidth parts (BWP).

The symbol in the embodiments of this application is a time domain symbol, and may be an orthogonal frequency division multiplexing (OFDM) symbol or a discrete Fourier transform spread orthogonal frequency division multiplexing (DFTS-OFDM) symbol.

In the embodiments of this application, reference signals include an uplink reference signal and a downlink reference signal. The uplink reference signal may be a demodulation reference signal (DMRS), a phase-tracking reference signal (PT-RS), a sounding reference signal (SRS), or another reference signal. This is not limited in the embodiments of this application. Uplink DMRSs may further be classified into a physical uplink shared channel (PUSCH) DMRS and a physical uplink control channel (PUCCH) DMRS. The downlink reference signal may be a demodulation reference signal DMRS, a phase-tracking reference signal PT-RS, a channel state information reference signal (CSI-RS), a synchronization sequence/physical broadcast channel block (SSB), or another reference signal. This is not limited in the embodiments of this application. Downlink DMRSs are further classified into a physical downlink shared channel (PDSCH) DMRS, a physical downlink control channel (PDCCH) DMRS, and a physical broadcast channel (PBCH) DMRS.

It should be noted that, for ease of description, an example in which the reference signal is a DMRS is used for description below. It may be understood that reference signals may be different in different data transmission scenarios.

A method in the embodiments of this application is usable in uplink information transmission and downlink information transmission. Uplink information is uplink data and/or uplink control information, and downlink information is downlink data and/or downlink control information. The following separately describes the uplink information transmission and the downlink information transmission.

The uplink information is transmitted in two transmission modes. One transmission mode is a dynamic scheduling-based transmission mode, and the other transmission mode is a configured grant (CG)-based transmission mode. It may be understood that the configured grant-based transmission mode may also be referred to as a non-dynamic scheduling-based transmission mode.

In the dynamic scheduling-based transmission mode of the uplink information, a network device sends scheduling information to a terminal device. The scheduling information may be used to indicate a time-frequency resource for transmitting an uplink reference signal and/or a time-frequency resource for transmitting the uplink information. The following provides descriptions by using an example in which the scheduling information in the dynamic scheduling-based transmission mode is downlink control information (DCI). However, the embodiments of this application are not limited thereto.

For example, the uplink information is information carried on a PUSCH. The network device may send the DCI to the terminal device, where the DCI carries indication information indicating a time-frequency resource for a DMRS, and/or the DCI carries indication information indicating a time domain resource or a frequency domain resource for the PUSCH, or a modulation scheme or the like of the PUSCH. After receiving the DCI, the terminal device may determine a time-frequency resource on which the DMRS and/or the PUSCH channel are/is to be transmitted.

In the configured grant-based transmission mode of the uplink information, a network device may send configuration information to a terminal device, where the configuration information is used to configure uplink transmission without dynamic grant. In this way, the network device may configure a part or all of transmission resources for the terminal device by sending the configuration information. Optionally, the configuration information may be higher layer signaling, and the higher layer signaling may be radio resource control (RRC) signaling or a medium access control (MAC) control element (CE).

It should be noted that the configured grant-based transmission may also be referred to as scheduling-free transmission, transmission without dynamic grant, grant-free (GF) transmission, autonomous uplink (AUL) transmission, configured grant uplink transmission (CGL), or contention-based transmission. This is not limited in the embodiments of this application.

The configured grant-based transmission mode may be classified into a type 1 transmission mode and a type 2 transmission mode. The following separately describes the two transmission modes in detail.

The type 1 transmission mode may also be referred to as a grant-free transmission mode. In the type 1 transmission mode, all transmission parameters are configured by using configuration information. Herein, the transmission parameters include information such as time domain resource allocation, frequency domain resource allocation, and a modulation and coding scheme for the uplink information transmission. In this implementation, the terminal device may send, without waiting for scheduling information or grant information that is sent by the network device by using DCI, an uplink reference signal and/or the uplink information on a configured resource that can be used for the uplink information transmission.

The type 2 transmission mode may also be referred to as a semi-persistent scheduling (SPS)-based transmission mode. In the type 2 transmission mode, a part of transmission parameters are configured by using configuration information, and a remaining transmission parameter is indicated by scheduling information or grant information in DCI. Transmission parameters indicated by the scheduling information may include information such as time domain resource allocation, frequency domain resource allocation, and a modulation and coding scheme for the uplink information transmission, and transmission parameters configured by using the configuration information may include a resource periodicity, a resource configuration type, a modulation and coding scheme table, and the like. In this implementation, the terminal device may further receive the scheduling information sent by the network device by using the DCI, and then send an uplink reference signal and/or the uplink information to the network device based on the configuration information and the scheduling information.

It may be understood that, a difference from the dynamic scheduling-based uplink transmission lies in that, in the type 2 transmission mode, the network device does not need to send scheduling information in each uplink transmission to provide an indication to the terminal device. In other words, after the terminal device receives, at one time, scheduling information used to activate the type 2 transmission mode, a transmission parameter indicated by the scheduling information may be used in subsequent uplink transmission. Optionally, in the embodiments of this application, the terminal device may further receive scheduling information used to deactivate the type 2 transmission mode. After receiving the scheduling information, the terminal device stops this type 2 transmission, and may perform type 2 transmission again only when receiving again scheduling information used to activate the type 2 transmission mode. In an optional embodiment, the scheduling information may include one or more bit fields, and a value of the one or more bit fields may indicate whether the scheduling information is used to deactivate the type 2 transmission or activate the type 2 transmission.

For example, the uplink information is information carried on a PUSCH. The network device may send higher layer signaling to the terminal device in advance, where the higher layer signaling may carry configuration information indicating a time-frequency resource for a DMRS, and/or the higher layer signaling may carry configuration information indicating a time domain resource or a frequency domain resource for the PUSCH, or a modulation scheme or the like of the PUSCH. In a possible implementation, the terminal device may determine, based on the higher layer signaling received in advance, a resource used to transmit the DMRS and/or a resource used to transmit the PUSCH, and transmit the DMRS and/or the PUSCH channel on the determined resource. In another possible implementation, the network device may further send DCI to the terminal device. The terminal device determines, based on the higher layer signaling and the DCI, a resource used to transmit the DMRS and/or a resource used to transmit the PUSCH, and transmit the DMRS and/or the PUSCH channel on the determined resource.

It may be understood that the uplink information may alternatively be information carried on a PUCCH. For a behavior of the terminal device that is performed when the uplink information is the information carried on the PUCCH, refer to the behavior of the terminal device that is performed when the uplink information is the information carried on the PUSCH. For brevity, details are not described herein again.

The downlink information is transmitted in two transmission modes. One transmission mode is a dynamic scheduling-based transmission mode, and the other transmission mode is a semi-persistent scheduling-based transmission mode. It may be understood that the semi-persistent scheduling-based transmission mode may also be referred to as a semi-persistent scheduling-based transmission mode.

In the dynamic scheduling-based transmission mode of the downlink information, a network device sends DCI to a terminal device. The DCI may be used to indicate a time-frequency resource for transmitting a downlink reference signal and/or a time-frequency resource for transmitting the downlink information.

For example, the downlink information is information carried on a PDSCH. The network device may send DCI to the terminal device, where the DCI may carry indication information indicating a time-frequency resource for a DMRS, and/or the DCI may carry indication information indicating a time-frequency resource for the PDSCH, or a modulation scheme or the like of the PDSCH. After receiving the DCI, the terminal device may determine a time-frequency resource on which the DMRS and/or the PDSCH are/is to be received. Optionally, when the DCI is used to indicate the time-frequency resources for the DMRS and the time-frequency resources for the PDSCH channel, the terminal device may perform channel estimation based on the DMRS, and demodulate and decode, based on the DCI and a result of the channel estimation, the downlink information transmitted on the PDSCH.

In the semi-persistent scheduling-based transmission mode of the downlink information, a network device may send configuration information to a terminal device, where the configuration information is used to configure semi-persistent scheduling-based downlink transmission. In this way, the network device may configure a semi-persistent scheduling resource periodicity, a resource configuration type, a modulation and coding scheme table, or the like for the terminal device by sending the configuration information. In the semi-persistent scheduling-based transmission mode of the downlink information, the terminal device may further receive scheduling information sent by the network device by using DCI, and then receive, based on the configuration information and the scheduling information, a downlink reference signal and/or the downlink information that are/is sent by the network device.

It may be understood that, a difference from the dynamic scheduling-based downlink transmission lies in that, in this implementation, the network device does not need to send scheduling information to the terminal device in each downlink transmission. In other words, after the terminal device receives, at one time, scheduling information used to activate semi-persistent scheduling, a transmission parameter indicated by the scheduling information may be used in subsequent uplink transmission. Optionally, in the embodiments of this application, the terminal device may further receive scheduling information used to deactivate the semi-persistent scheduling. After receiving the scheduling information, the terminal device stops this semi-persistent scheduling-based transmission, and may perform semi-persistent scheduling-based transmission again only when receiving again scheduling information used to activate the semi-persistent scheduling. In an optional embodiment, the scheduling information may include one or more bit fields, and a value of the one or more bit fields may indicate whether the scheduling information is used to deactivate the semi-persistent scheduling or activate the semi-persistent scheduling.

For example, the downlink information is information carried on a PDSCH. The network device may send higher layer signaling to the terminal device in advance, where the higher layer signaling may carry configuration information indicating a time domain resource and/or a frequency domain resource occupied by a DMRS, and/or the higher layer signaling may carry configuration information indicating a time domain resource or a frequency domain resource occupied by the PDSCH, or a modulation scheme or the like of the PDSCH. The network device may further send DCI to the terminal device. The terminal device determines, based on the higher layer signaling and the DCI, a resource on which the DMRS and/or the PDSCH channel are/is to be received.

It may be understood that the downlink information may alternatively be information carried on a PDCCH. For a behavior of the terminal device that is performed when the downlink information is the information carried on the PDCCH, refer to the behavior of the terminal device that is performed when the downlink information is the information carried on the PDSCH. For brevity, details are not described herein again.

It should be noted that in the embodiments of this application, in the uplink information transmission, a terminal device may support both the dynamic scheduling-based transmission mode and the configured grant-based transmission mode, or may support only one of the dynamic scheduling-based transmission mode or the configured grant-based transmission mode. This is not limited in the embodiments of this application. In the downlink information transmission, a terminal device may support both the dynamic scheduling-based transmission mode and the semi-persistent scheduling-based transmission mode, or may support only one of the dynamic scheduling-based transmission mode or the semi-persistent scheduling-based transmission mode. This is not limited in the embodiments of this application.

Optionally, in the embodiments of this application, in the downlink information transmission, the terminal device may also support a configured grant-based transmission mode. To be specific, all transmission parameters are configured for the terminal device by using higher layer signaling. For other details, refer to the descriptions of the type 1 transmission mode. For brevity, details are not described herein again.

Figure 2:
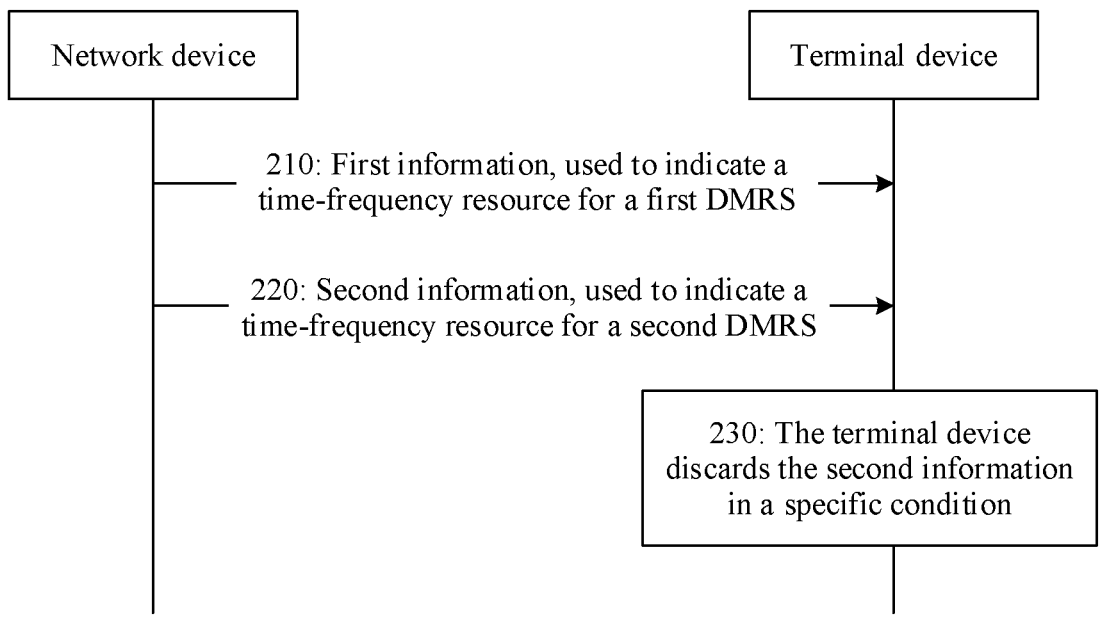
FIG. 2 is a schematic flowchart of an information processing method according to an embodiment of this application.

FIG. 2 is a schematic flowchart of an information processing method 200 according to an embodiment of this application. The processing method 200 is an information processing method: When a time-frequency resource, for a first DMRS, indicated by first information overlaps a time-frequency resource, for a second DMRS, indicated by second information, but another parameter indicated by the first information is different from that indicated by the second information, a terminal device discards the second information, to avoid a behavior error or behavior unpredictability of the terminal device.

It should be understood that, in FIG. 2, the processing method 200 is described by using an example in which the processing method 200 is performed by the terminal device and a network device. As an example instead of a limitation, the method 200 may alternatively be performed by a chip of the corresponding terminal device and a chip of the corresponding network device.

It should further be understood that FIG. 2 shows steps or operations of the information processing method, but these steps or operations are merely examples. Another operation or a variation of each operation in FIG. 2 may alternatively be performed in this embodiment of this application. In addition, the steps or operations in FIG. 2 may be performed in a sequence different from that presented in FIG. 2, and possibly, not all operations in FIG. 2 need to be performed.

210. The network device sends the first information to the terminal device, where the first information is used to indicate the time-frequency resource for the first DMRS. Correspondingly, the terminal device receives the first information sent by the network device.

Optionally, in this embodiment of this application, the first information may further be used to indicate a time domain resource for a first channel.

In this embodiment of this application, the first information may explicitly indicate the time-frequency resource for the first DMRS, or may implicitly indicate the time-frequency resource for the first DMRS. This is not limited in this embodiment of this application.

In an explicit indication manner, the first information may include a dedicated information field or a dedicated bit field, to indicate the time-frequency resource for the first DMRS. For example, a first information field or a first bit field may be used to indicate information, for example, symbol information and/or slot information, about a time domain resource for the first DMRS. The first information field or the first bit field may alternatively be used to indicate information, for example, BWP information, RB information, and RE information, about a frequency domain resource for the first DMRS.

In an implicit indication manner, there is no dedicated information field or dedicated bit field, in the first information, used to indicate a time domain resource for the first DMRS. The terminal device may determine information about the time-frequency resource for the first DMRS by using information in another information field or bit field. For example, it is predefined or is configured by using higher layer signaling that the time domain resource for the first DMRS is after the first channel or before the first channel, or on an $A1^{th}$ symbol in the first channel, where A1 is a positive integer; or that a frequency domain resource for the first DMRS is above the first channel or below the first channel, or on an $A2^{th}$ RB in the first channel, where A2 is a positive integer. For example, it is predefined or is configured by using higher layer signaling that the time domain resource for the first DMRS is on an $A3^{th}$ symbol in a first slot, where A3 is a positive integer; or that the frequency domain resource for the first DMRS is on an $A4^{th}$ RB in a first slot, where A4 is a positive integer. The first slot may be a slot in which the first channel is located, or a slot adjacent to a slot in which the first channel is located, or a slot having an interval of A5 slots from a slot in which the first channel is located, where A5 is a positive integer. The terminal device may first determine the time domain resource for the first channel, and then determine the time-frequency resource for the first DMRS according to the rule that is predefined or that is configured by using the higher layer signaling. Herein, the first channel is, for example, one of a PDSCH, a PUSCH, a PUCCH, and a PDCCH. In addition, the time domain resource for the first DMRS may be within a time-frequency resource for the first channel, or may be outside a time-frequency resource for the first channel. This is not limited in this embodiment of this application.

In this embodiment of this application, optionally, step 210 may alternatively be replaced with the following: The terminal device may alternatively determine the time-frequency resource for the first DMRS in a predefined manner. It may be understood that in this case, in the following step 220 and step 230, "the time-frequency resource, for the first DMRS, indicated by the first information" may be replaced with "the predefined time-frequency resource for the first DMRS", and "the time-frequency resource, for the first channel, indicated by the first information" may be replaced with "the predefined time-frequency resource for the first channel".

220. The network device sends the second information to the terminal device. Correspondingly, the terminal device receives the second information sent by the network device.

Figure 3:
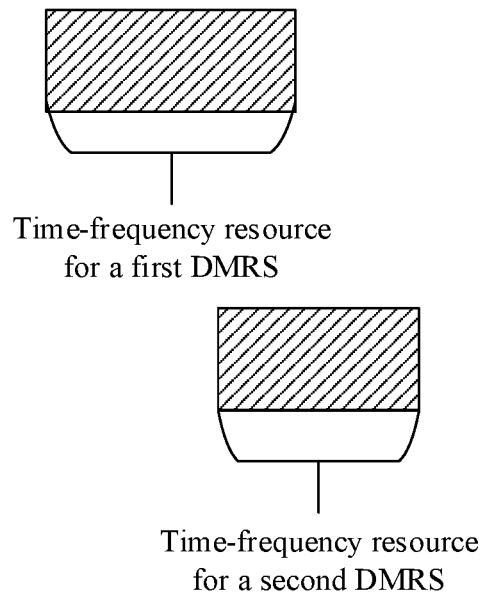
FIG. 3 is a possible schematic diagram of a time domain resource for a first DMRS and a time domain resource for a second DMRS.
Figure 4:
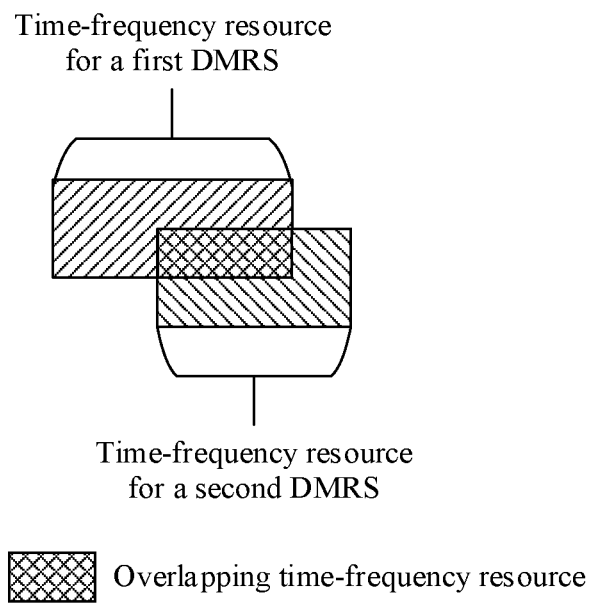
FIG. 4 is another possible schematic diagram of a time domain resource for a first DMRS and a time domain resource for a second DMRS.

Optionally, in this embodiment of this application, the second information is used to indicate the time-frequency resource for the second DMRS, and the time-frequency resource for the second DMRS overlaps the time-frequency resource for the first DMRS. In this embodiment of this application, resource overlapping may be partial resource overlapping, or may be complete resource overlapping. Overlapping of time-frequency resources may mean that both time domain resources and frequency domain resources overlap, or may mean that only time domain resources overlap, or may mean that only frequency domain resources overlap. As an example instead of a limitation, FIG. 3 is a schematic diagram showing that a time domain resource for a first DMRS partially overlaps a time domain resource for a second DMRS but a frequency domain resource for the first DMRS does not overlap a frequency domain resource for the second DMRS; and FIG. 4 is a schematic diagram showing that a time domain resource for a first DMRS partially overlaps a time domain resource for a second DMRS and a frequency domain resource for the first DMRS also partially overlaps a frequency domain resource for the second DMRS. Optionally, for example, both the first DMRS and the second DMRS in FIG. 3 may be downlink DMRSs or uplink DMRSs, and both the first DMRS and the second DMRS in FIG. 4 may be downlink DMRSs or uplink DMRSs.

In this embodiment of this application, for a manner of indicating the time-frequency resource for the second DMRS by the second information, refer to the manner of indicating the time-frequency resource for the first DMRS by the first information. For brevity, details are not described herein again.

Optionally, in this embodiment of this application, the second information may further be used to indicate a time domain resource for a second channel, and the time domain resource for the second channel overlaps the time domain resource for the first DMRS. Herein, the second channel is, for example, one of a PDSCH, a PUSCH, a PUCCH, and a PDCCH.

In an optional embodiment, the time domain resource for the second channel overlaps a time domain resource for the second DMRS. In another optional embodiment, the time domain resource for the second channel does not overlap a time domain resource for the second DMRS.

In this embodiment of this application, a slot in which the last symbol or the first symbol of the first DMRS is located is defined as a first slot, a slot in which the time domain resource for the first channel is located is a second slot, and a slot in which the time domain resource for the second channel is located is a third slot.

Optionally, a distance between a start moment of the first slot and a start moment of the second slot is less than or equal to 14*B1 symbols, where B1 is an integer greater than or equal to 0. Optionally, a value of B1 may be one of 0, 1, 2, and 3.

Optionally, a distance between a start moment of the first slot and a start moment of the second slot is less than or equal to 3*(a subcarrier spacing index+1) slots. In this embodiment of this application, a subcarrier spacing index corresponding to a subcarrier spacing of 15 kHz is 0, a subcarrier spacing index corresponding to a subcarrier spacing of 30 kHz is 1, a subcarrier spacing index corresponding to a subcarrier spacing of 60 kHz is 2, and a subcarrier spacing index corresponding to a subcarrier spacing of 120 kHz is 3. In this embodiment of this application, there may be another correspondence between a subcarrier spacing and an index number. This is not limited in this embodiment of this application.

Optionally, a distance between a start moment of the time domain resource for the first DMRS and a start moment of the time domain resource for the first channel is less than or equal to B2 symbols, where B2 is an integer greater than or equal to 0. For example, B2=1, 7, 14, 3*(a subcarrier spacing index+1), 3*7*(a subcarrier spacing index+1), or 3*14*(a subcarrier spacing index+1).

In this embodiment of this application, the distance between the start moment of the first slot and the start moment of the second slot is less than or equal to 14*B1 symbols, or is less than or equal to 3*(the subcarrier spacing index+1) slots; or the distance between the start moment of the time domain resource for the first DMRS and the start moment of the time domain resource for the first channel is less than or equal to B2 symbols, so that an interval between the first DMRS and the first channel is relatively small. In this way, a channel status obtained by a receive end by performing channel estimation by using the first DMRS is more approximate to an actual channel status of the first channel, so that performance of demodulation on the first channel can be improved at the receive end.

Optionally, a distance between a start moment of the second slot and a start moment of the third slot is less than or equal to 14*B3 symbols, where B3 is an integer greater than or equal to 0. Optionally, a value of B3 may be one of 0, 1, 2, and 3.

Optionally, a distance between a start moment of the second slot and a start moment of the third slot is equal to 3*(a subcarrier spacing index+1).

Optionally, a distance between a start moment of the time domain resource for the first channel and a start moment of the time domain resource for the second channel is less than or equal to B4 symbols, where B4 is an integer greater than or equal to 0. For example, B4=1, 7, 14, 3*(a subcarrier spacing index+1), 3*7*(a subcarrier spacing index+1), or 3*14*(a subcarrier spacing index+1). For the subcarrier spacing index, refer to the foregoing descriptions. Details are not described herein again.

In this embodiment of this application, the distance between the start moment of the second slot and the start moment of the third slot is less than or equal to 14*B3 symbols, or is equal to 3*(the subcarrier spacing index+1); or the distance between the start moment of the time domain resource for the first channel and the start moment of the time domain resource for the second channel is less than or equal to B4 symbols, so that a same DMRS can be used for the first channel and the second channel for channel estimation.

In this embodiment of this application, the first information includes first downlink control information DCI and the second information includes second DCI, or the first information includes first configuration information and the second information includes second DCI, or the first information includes first DCI and the second information includes second configuration information.

Uplink information may be transmitted in at least one of a dynamic scheduling-based transmission mode and a configured grant-based transmission mode, and downlink information may be transmitted in at least one of a dynamic scheduling-based transmission mode and a semi-persistent scheduling-based transmission mode. This is not limited in this embodiment of this application. For the dynamic scheduling-based transmission mode, the configured grant-based transmission mode, and the semi-persistent scheduling-based transmission mode, refer to the foregoing descriptions. Details are not described herein again.

Optionally, the first DCI is uplink scheduling information or downlink scheduling information, the second DCI is uplink scheduling information or downlink scheduling information, the first configuration information is uplink channel configuration information or downlink channel configuration information, and the second configuration information is uplink channel configuration information or downlink channel configuration information. The first DCI and the first configuration information are codirectional, and the second DCI and the second configuration information are codirectional. The term "codirectional" herein means controlling information transmission that is in a same direction, and the direction herein includes an uplink direction and a downlink direction. The uplink direction refers to sending from the terminal device to the network device, and the downlink direction refers to sending from the network device to the terminal device.

In a possible scenario 1, the uplink information or the downlink information is transmitted in the dynamic scheduling-based transmission mode. The first information includes the first downlink control information DCI, and the second information includes the second DCI.

In a possible scenario 2, the uplink information is transmitted in the dynamic scheduling-based transmission mode and the configured grant-based transmission mode. Details are as follows:
the first information includes the first configuration information, and the second information includes the second DCI; or
the first information includes the first configuration information and the first DCI, and the second information includes the second DCI; or
the first information includes the first DCI, and the second information includes the second configuration information; or
the first information includes the first DCI, and the second information includes the second configuration information and the second DCI.

In a possible scenario 3, the downlink information is transmitted in the dynamic scheduling-based transmission mode and the semi-persistent scheduling-based transmission mode. Details are as follows:

the first information includes the first configuration information and the first DCI, and the second information includes the second DCI; or the first information includes the first DCI, and the second information includes the second configuration information and the second DCI.

In a possible scenario 4, the downlink information is transmitted in the configured grant-based transmission mode and the semi-persistent scheduling-based transmission mode. Details are as follows:

the first information includes the first configuration information and the first DCI, and the second information includes the second configuration information; or the first information includes the first configuration information, and the second information includes the second configuration information and the second DCI.

Figure 5:
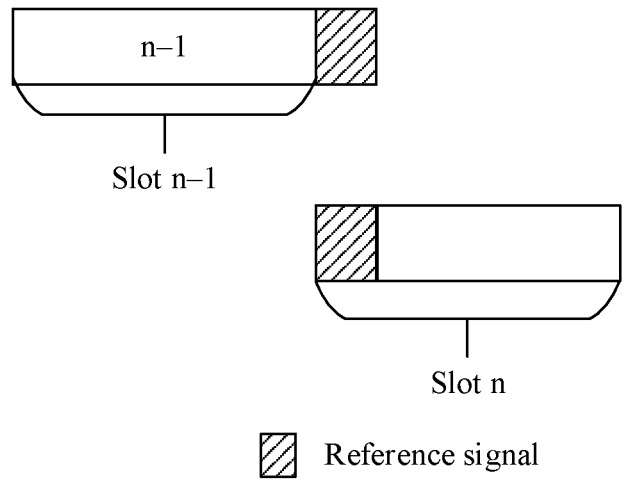
FIG. 5 is a schematic diagram of a specific scenario, of an information processing method, in which an embodiment of this application is used.

FIG. 5 is a schematic diagram of a specific scenario, of an information processing method, in which an embodiment of this application is used. The first information may indicate to transmit a DMRS on at least one symbol in a time unit n. Optionally, the first information may further be used to indicate to transmit uplink or downlink information on a time-frequency resource in a time unit n−1. The second information may be used to indicate to transmit a DMRS on at least one symbol in the time unit n. In FIG. 5, an example in which a time unit on a time domain resource is a slot is used for description. However, this embodiment of this application is not limited thereto. For example, in some possible implementations, one time unit may alternatively be one or more time domain symbols, one or more slots, or one or more subframes.

In FIG. 5, the first information may indicate to transmit the DMRS on the symbol in the slot n. Optionally, the first information may further be used to indicate to transmit the uplink or downlink information on the time-frequency resource in the slot n−1. In a specific example, the first information indicates to transmit the DMRS on the first symbol in the slot n (that is, the first symbol after the slot n−1). Optionally, the first information may further be used to indicate to send the uplink information or receive the downlink information on the time-frequency resource in the slot n−1. Herein, transmitting the DMRS may also be understood as sending the DMRS or receiving the DMRS.

In a possible implementation, the second information may indicate to transmit a DMRS on a time-frequency resource in the slot n. In another possible implementation, the second information may not indicate to transmit a DMRS on a time-frequency resource in the slot n. In other words, the second information may indicate not to transmit a DMRS on a time-frequency resource in the slot n.

It should be understood that FIG. 5 merely shows an example, and this embodiment of this application is not limited thereto. For example, the first information may alternatively indicate to transmit a DMRS on the second symbol, the third symbol, or another symbol in the slot n. For another example, the first information may indicate to transmit uplink or downlink information on a time-frequency resource in the slot n−1. For another example, the first information may alternatively indicate to transmit a DMRS on the first symbol in a slot n+1.

It should be noted that a time sequence of receiving the first information and receiving the second information by the terminal device is not limited in this embodiment of this application. In other words, the terminal device may receive the second information after receiving the first information, or receive the first message after receiving the second information, or simultaneously receive the first information and the second information.

It should further be noted that positions of the time domain resources for the first channel and the second channel are not limited in this embodiment of this application. In other words, the start moment of the time domain resource for the first channel may be before the start moment of the time domain resource for the second channel, or the start moment of the time domain resource for the first channel may be after the start moment of the time domain resource for the second channel, or the time domain resource for the first channel and the time domain resource for the second channel at least partially overlap.

230. The terminal device may discard the second information in a specific condition.

Herein, that the terminal device discards the second information may be understood as that the terminal device abandons transmitting the DMRS indicated by the second information, or the terminal device does not transmit a DMRS based on the second information, or the terminal device transmits a DMRS based on the first information, or the terminal device does not skip transmitting a DMRS based on the second information. Optionally, the second information is further used to indicate the second channel. In this case, that the terminal device may discard the second information may further be understood as that the terminal device abandons transmitting the second channel indicated by the second information, or the terminal device does not transmit information on the second channel based on the second information, or the terminal device transmits information on the second channel based on the first information. It may be understood that, that the terminal device discards the second information is equivalent to that the terminal device may discard the second DMRS and/or the second channel in a specific condition.

Optionally, in this embodiment of this application, when the first information indicates the uplink information transmission and the second information indicates the downlink information transmission, or the first information indicates the downlink information transmission and the second information indicates the uplink information transmission, the terminal device discards the second information.

Optionally, in this embodiment of this application, when a time-frequency resource, for the second channel, indicated by the second information does not overlap the time-frequency resource for the second DMRS, the terminal device discards the second information. The time-frequency resource for the second channel overlaps the time-frequency resource for the first DMRS. Because the first information indicates that the first DMRS is to be sent on the time-frequency resource for the second channel, when the second information does not indicate to send a DMRS on the time-frequency resource for the second channel, the first information is inconsistent with the second information. In this case, the terminal device may discard the second information and comply with information indicated by the first information.

Optionally, in this embodiment of this application, when the time-frequency resource, for the second DMRS, indicated by the second information does not overlap a first time unit, the terminal device discards the second information. The first time unit overlaps the time-frequency resource for the first DMRS. The time unit may be one or more slots, or one or more symbols. Optionally, the first time unit is a time unit in which the time-frequency resource for the second channel is located.

In a specific example, for FIG. 5, when the first information indicates to transmit the DMRS on the symbol in the slot n, and the second information does not indicate to transmit the DMRS on the time-frequency resource in the slot n, the terminal device may discard the second information.

Optionally, in this embodiment of this application, when the second information is used to indicate the time-frequency resource for the second DMRS, and the time-frequency resource for the second DMRS overlaps the time-frequency resource for the first DMRS, the terminal device discards the second information if a first condition is met.

When the time-frequency resource for the second DMRS overlaps the time-frequency resource for the first DMRS, information corresponding to the first DMRS needs to be the same as information corresponding to the second DMRS, and/or information transmit power, on the first channel, indicated by the first information needs to be the same as information transmit power, on the second channel, indicated by the second information, and/or information transmit power, in a first time unit, indicated by the first information needs to be the same as information transmit power, in a second time unit, indicated by the second information. In this way, the terminal device can transmit the DMRSs based on indications of the first information and the second information. Herein, the first time unit and the second time unit may be a same time unit, or may be different time units.

In a specific example, for FIG. 5, when the first information indicates to transmit the DMRS on the symbol in the slot n, and the second information indicates to transmit the DMRS on the time-frequency resource in the slot n, the terminal device may further determine whether information, corresponding to the DMRS, indicated by the first information is the same as information, corresponding to the DMRS, indicated by the second information. Optionally, the terminal device may further determine whether transmit power, in the slot n−1, indicated by the first information is the same as transmit power, in the slot n, indicated by the second information. Optionally, the terminal device may further determine whether transmit power, on the first channel, indicated by the first information is the same as transmit power, on the second channel, indicated by the second information.

Optionally, the terminal device reports that a capability of transmitting two or more DMRSs is not supported, where the two or more DMRSs overlap in time domain.

Optionally, the terminal device receives higher layer signaling sent by the network device, and is configured not to be capable of transmitting two or more DMRSs, where the two or more DMRSs overlap in time domain. Optionally, herein, the terminal device may report that a capability of transmitting two or more DMRSs is supported.

Frequency domain resources for the two or more DMRSs are in one serving cell, or in one bandwidth part, or in a plurality of bandwidth parts of one serving cell, or on different uplinks. The uplink herein may alternatively be a supplementary uplink.

Optionally, in this embodiment of this application, the first condition may include at least one of the following conditions: Option 1 to Option 3.

Option 1: Bandwidth part indication information indicated by the second information is different from bandwidth part indication information indicated by the first information.

Optionally, the terminal device reports that a capability of simultaneously transmitting more than one bandwidth part (BWP) in one serving cell is not supported.

Optionally, the terminal device receives higher layer signaling sent by the network device, and is configured not to support simultaneous transmission of more than one bandwidth part in one serving cell. Optionally, in this case, the terminal device may report that a capability of simultaneously transmitting more than one bandwidth part in one serving cell is supported.

Because a plurality of pieces of bandwidth part indication information configured by using higher layer signaling correspond to different bandwidth parts, if the time domain resource for the first DMRS overlaps the time domain resource for the second DMRS, the terminal device needs to have a capability of simultaneously transmitting DMRSs in different BWPs. If the terminal device does not have the capability of simultaneously transmitting more than one BWP, the terminal device cannot simultaneously transmit two DMRSs. If the DMRSs are transmitted based on the indications of the first information and the second information, a behavior error of the terminal device is caused. Therefore, the terminal device may discard the second information. Further, if the first information is inconsistent with the second information, BWPs used to transmit the DMRSs twice are different. In this case, a DMRS corresponding to the first channel cannot be used for information demodulation on the second channel.

Option 2: Antenna port information indicated by the second information is different from antenna port information indicated by the first information.

In an NR system, DMRSs corresponding to different antenna port numbers correspond to different precoding matrices. DMRSs corresponding to different antenna port numbers may further correspond to different time-frequency resources for DMRSs. Therefore, when the antenna port information indicated by the second information is different from the antenna port information indicated by the first information, it indicates that the first DMRS is different from the second DMRS. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Option 3: DMRS sequence initialization information indicated by the second information is different from DMRS sequence initialization information indicated by the first information.

The DMRS sequence initialization information is information used to generate a DMRS sequence.

Optionally, in this embodiment of this application, DMRS sequence initialization $c_{init}$ may be determined according to a formula (1):

$$c_{init}=(2^{17}(N_{symb}^{slot}n_{s,f}^{\mu}+l+1)(2N_{ID}^{nSCID}+1)+2N_{ID}^{nSCID}+n_{SCID})\bmod 2^{31} \quad (1)$$

l is a quantity of OFDM symbols for a DMRS in one slot, $n_{s,f}^{\mu}$ is a quantity of slots in one subframe, and $N_{symbol}^{slot}$ is a quantity of symbols in one slot.

Optionally, a value of $n_{SCID}$ may be determined based on the DMRS sequence initialization information. Optionally, in an example, $n_{SCID}$ is 0 or 1. In this case, $N_{ID}^{nSCID}$ may be determined based on a higher layer signaling parameter or a predefinition. In an example, $N_{ID}^{nSCID}$ is a positive integer whose value range is {0, . . . , 65535}.

Optionally, a value of $N_{ID}^{nSCID}$ may be determined based on the DMRS sequence initialization information. Optionally, in an example, $N_{ID}^{nSCID}$ is a positive integer whose value range is {0, . . . , 65535}.

It should be noted that a DMRS sequence initialization formula in this embodiment of this application is not limited to the form of the formula (1). For example, the DMRS sequence initialization formula may be various variations of the formula (1), or may be a formula that is in another form and that includes $N_{ID}^{nSCID}$ or $n_{SCID}$. This is not limited in this embodiment of this application. It may be understood that a case in which the DMRS sequence initialization formula includes the formula $N_{ID}^{nSCID}$ or $n_{SCID}$ falls within the protection scope of this embodiment of this application.

When second DMRS sequence initialization indicated by the second information is different from first DMRS sequence initialization indicated by the first information, two completely different DMRS signals are generated according to a second DMRS sequence initialization formula and a first DMRS sequence initialization formula. Because the time-frequency resource for the first DMRS overlaps the time-frequency resource for the second DMRS, and the terminal device cannot simultaneously transmit the two different DMRSs, if the DMRSs are transmitted based on the indications of the first information and the second information, a behavior error of the terminal device is caused. Therefore, the terminal device may discard the second information.

It should be noted that, in this embodiment of this application, for both the uplink transmission and the downlink transmission, the second information may be discarded when the first information and the second information meet at least one of Option 1 to Option 3.

Optionally, in this embodiment of this application, the first information includes the first DCI, the second information includes the second DCI, and a DCI format identifier in each of the first DCI and the second DCI is 0; or the first information includes the first configuration information, the second information includes the second DCI, a DCI format identifier in the second DCI is 0, and the first configuration information is used to configure uplink transmission without dynamic grant; or the second information includes the second configuration information, the first information includes the first DCI, a DCI format identifier in the first DCI is 0, and the second configuration information is used to configure uplink transmission without dynamic grant.

It should be noted that a DCI format identifier of DCI is set to 0 indicates that the DCI is used to indicate transmission of uplink information. In an example, the DCI format identifier may occupy one bit in the DCI. This is not limited in this embodiment of this application.

It should further be noted that the first configuration information herein may be higher layer signaling, for example, a configured grant configuration (ConfiguredGrantConfig), and is used to configure the uplink transmission without dynamic grant. The uplink transmission without dynamic grant may be understood as uplink transmission that does not need to be scheduled by using DCI each time.

Optionally, in this embodiment of this application, for the uplink information transmission, the terminal device discards the second information when at least one of the following conditions, namely, Option 4 to Option 7, is met.

Alternatively, optionally, the first condition described above may further include at least one of Option 4 to Option 7.

Option 4: Uplink (UL) indication information and supplementary uplink (SUL) indication information that are indicated by the second information are different from uplink indication information and supplementary uplink indication information that are indicated by the first information.

UL/SUL indication information is introduced into DCI or configuration information used to indicate the uplink information transmission, to indicate that a PUSCH is to be sent on a UL or an SUL. The configuration information may be the first configuration information and/or the second configuration information. Usually, the UL and the SUL correspond to different carrier central frequencies.

It may be understood that, when the first information indicates that the first DMRS is to be transmitted on the UL, and the second information indicates that the second DMRS is to be transmitted on the SUL, it means that a carrier is switched during two DMRS transmissions. It is stipulated in a protocol that the UL and the SUL belong to a same cell, and the terminal device can transmit only one DMRS in the cell. Therefore, when the time domain resource for the first DMRS overlaps the time domain resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Option 5: Frequency hopping information indicated by the second information is different from frequency hopping information indicated by the first information.

Frequency hopping information is introduced into DCI or configuration information that is used to indicate the uplink information transmission, and the frequency hopping information may be a frequency hopping flag. For example, when a value of the frequency hopping flag is 1, it indicates that frequency hopping is to be performed; or when a value of the frequency hopping flag is 0, it indicates that frequency hopping is not to be performed. If the frequency hopping flag indicates that frequency hopping is to be performed, a frequency domain resource for information changes for one or more times in one information transmission process. If the frequency hopping flag indicates that frequency hopping is not to be performed, a frequency domain resource for information remains unchanged in one information transmission process.

It may be understood that, when the first information indicates to perform frequency hopping when indicating transmission of the first DMRS, and the second information indicates not to perform frequency hopping when indicating transmission of the second DMRS, it means that frequency domain resources for the two DMRS transmissions are different. When the time domain resource for the first DMRS overlaps the time domain resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Option 6: A phase-tracking reference signal (PTRS)-demodulation reference signal DMRS association indicated by the second information is different from a PTRS-DMRS association indicated by the first information.

Port number indication information used for the PTRS-DMRS association changes, and therefore the first DMRS and the second DMRS correspond to different antenna ports with best performance. In this case, it is proved that a spatial channel changes in a process of transmitting the first information and the second information.

It may be understood that when the corresponding antenna port with best performance during transmission of the first DMRS indicated by the first information is different from the corresponding antenna port with best performance during transmission of the second DMRS indicated by the second information, and the time-frequency resource for the first DMRS overlaps the time-frequency resource for the second DMRS, the terminal device can neither simultaneously transmit the two DMRSs nor determine statuses of the antenna ports. If the DMRSs are transmitted based on the indications of the first information and the second information, a behavior error of the terminal device may be caused. Therefore, the terminal device may discard the second information. Further, in a communications system, it is considered that different ports are approximately independent of each other, that is, are irrelevant to each other, and different radio channels are also approximately independent of each other. Therefore, a same DMRS cannot be used for demodulation on physical control channels or physical data channels indicated by the first information and the second information, that is, the DMRS cannot be shared.

Option 7: Closed-loop power control indication information indicated by the second information is different from closed-loop power control indication information indicated by the first information.

Closed power control indication information is introduced into DCI or configuration information used to indicate the uplink information transmission. The closed-loop power control indication information may be a PUSCH-closed-loop-index or a PUCCH-closed-loop-index, or may be higher layer signaling powerControlLoopToUse, and is used to indicate closed-loop power control. For example, a value of the PUSCH-closed-loop-index may be 0 or 1. If the terminal device is configured to be in a power command accumulation mode (tpc-Accumulation), when same closed-loop power control indication information is configured for two transmissions, and the terminal device receives a transmit power control (TPC) command word, power of current transmission is adjusted based on power of previous transmission. On the contrary, when different closed-loop power control indication information is configured for two transmissions, power of current transmission is not adjusted based on power of previous transmission, but is adjusted based on power of previous transmission for which same closed-loop power control indication information is configured.

It may be understood that, one of the first information and the second information indicates first closed-loop power control indication information, and the other indicates second closed-loop power control indication information. This means that power adjustment benchmarks for two information transmissions are different, a sudden change of transmit power may occur during the two information transmissions, and consequently, information transmission performance is deteriorated. Therefore, the terminal device may discard the second information.

Option 8: Transform precoder information indicated by the second information is different from transform precoder information indicated by the first information.

Specifically precoder information may be introduced into DCI or configuration information used to indicate the uplink information transmission. The transform precoder information may correspond to different waveforms, for example, an OFDM waveform and a single-carrier frequency division multiple access (SC-FDMA) waveform. The SC-FDMA waveform may be referred to as a PUSCH with transform precoder.

It may be understood that, when the first information corresponds to first transform precoder information (for example, the OFDM waveform) when indicating transmission of the first DMRS, and the second information corresponds to second transform precoder information (for example, the SC-FDMA waveform) when indicating transmission of the second DMRS, it means that the two DMRS transmissions correspond to different waveforms. When the time-frequency resource for the first DMRS overlaps the time-frequency resource for the second DMRS, the terminal device cannot simultaneously transmit the two DMRSs corresponding to different waveforms. If the DMRSs are transmitted based on the indications of the first information and the second information, a behavior error of the terminal device is caused. Therefore, the terminal device may discard the second information.

Optionally, in this embodiment of this application, when a serving cell indicated by the first information is the same as a serving cell indicated by the second information, and/or the BWP indication information indicated by the first information is the same as the BWP indication information indicated by the second information, and/or the UL/SUL indication information indicated by the first information is the same as the UL/SUL indication information indicated by the second information, the terminal device may further determine whether the first information and the second information meet Option 8.

Optionally, in this embodiment of this application, when the first channel and the second channel are uplink channels, the method 200 further includes: sending, by the terminal device, a third channel, where the third channel is used to carry configured grant-based uplink transmission.

Optionally, the terminal device discards the second information when at least one of the following conditions, namely, Option 9 to Option 11, is met. Alternatively, optionally, the first condition described above may further include at least one of the following conditions: Option 9 to Option 11.

Figure 6:
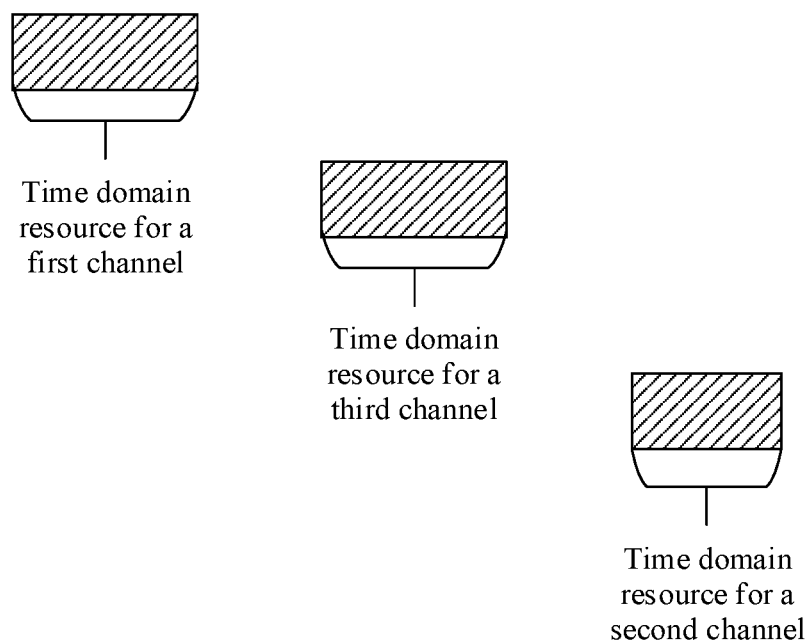
FIG. 6 is a schematic diagram of time domain resources for a first channel, a second channel, and a third channel according to an embodiment of this application.

Option 9: A time domain resource for the third channel is between the time domain resource for the first channel and the time domain resource for the second channel. FIG. 6 is a schematic diagram of the time domain resources for the first channel, the second channel, and the third channel in Option 9.

Figure 7:
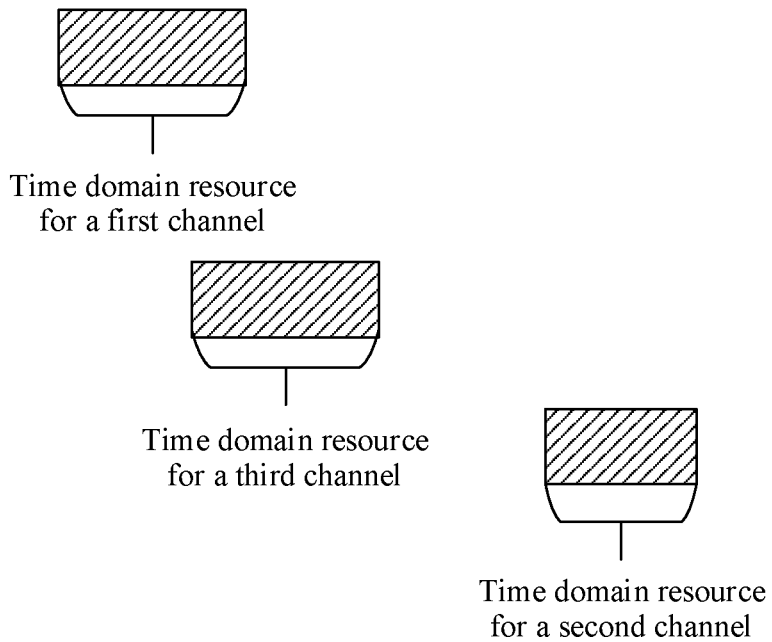
FIG. 7 is another schematic diagram of time domain resources for a first channel, a second channel, and a third channel according to an embodiment of this application.

Option 10: A time domain resource for the third channel overlaps the time domain resource for the first channel. FIG. 7 is a schematic diagram of the time domain resources for the first channel, the second channel, and the third channel in Option 10.

Figure 8:
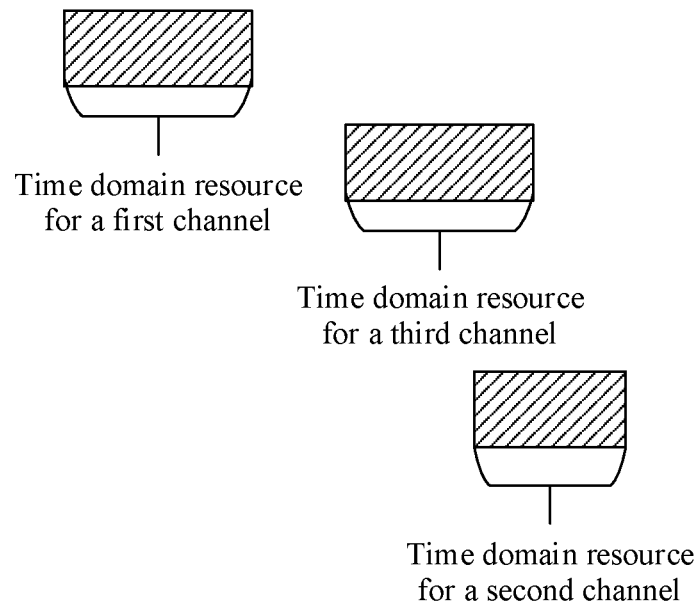
FIG. 8 is another schematic diagram of time domain resources for a first channel, a second channel, and a third channel according to an embodiment of this application.

Option 11: A time domain resource for the third channel overlaps the time domain resource for the second channel. FIG. 8 is a schematic diagram of the time domain resources for the first channel, the second channel, and the third channel in Option 11.

It may be understood that if the terminal device performs configured grant-based uplink transmission on a part or all of time domain resources between the time domain resource for the first channel and the time domain resource for the second channel, or the terminal device performs configured grant-based uplink transmission on a time domain resource overlapping the time domain resource for the first channel, or the terminal device performs configured grant-based uplink transmission on a time domain resource overlapping the time domain resource for the second channel, uplink transmit power of the terminal device may change. Consequently, uplink transmit power of the terminal device on the first channel is different from uplink transmit power of the terminal device on the second channel, and a same DMRS cannot be used for demodulation on the first channel and the second channel, that is, the DMRS cannot be shared.

Optionally, in this embodiment of this application, when the first channel and the second channel are uplink channels, the method 200 may further include: receiving, by the terminal device, a fifth channel, where the fifth channel is used to carry semi-persistent scheduling-based downlink information, or is used to carry scheduling-based downlink information.

Optionally, the terminal device discards the second information when at least one of the following conditions, namely, Option 12 to Option 14, is met. Alternatively, the first condition may further include at least one of the following conditions: Option 12 to Option 14.

Option 12: A time domain resource for the fifth channel is between the time domain resource for the first channel and the time domain resource for the second channel. In this case, a relationship among time domain positions of the fifth channel, the first channel, and the second channel is similar to a relationship among time domain positions of the third channel, the first channel, and the second channel in FIG. 6. For details, refer to the descriptions in FIG. 6, and details are not described herein again.

Option 13: A time domain resource for the fifth channel overlaps the time domain resource for the first channel. In this case, a relationship among time domain positions of the fifth channel, the first channel, and the second channel is similar to a relationship among time domain positions of the third channel, the first channel, and the second channel in FIG. 7. For details, refer to the descriptions in FIG. 7, and details are not described herein again.

Option 14: A time domain resource for the fifth channel overlaps the time domain resource for the second channel. In this case, a relationship among time domain positions of the fifth channel, the first channel, and the second channel is similar to a relationship among time domain positions of the third channel, the first channel, and the second channel in FIG. 8. For details, refer to the descriptions in FIG. 8, and details are not described herein again.

Optionally, in this embodiment of this application, a serving cell in which the first channel, the second channel, and the fifth channel are located is a first serving cell. Different moments in the first serving cell include an uplink moment and a downlink moment. The uplink moment includes at least one symbol, and the downlink moment includes at least one symbol. The uplink moment and the downlink moment may be predefined or may be configured by using higher layer signaling.

Optionally, in this embodiment of this application, a BWP in which the first channel, the second channel, and the fifth channel are located is a first BWP. Different moments in the first BWP include an uplink moment and a downlink moment. The uplink moment includes at least one symbol, and the downlink moment includes at least one symbol. The uplink moment and the downlink moment may be predefined or may be configured by using higher layer signaling.

It may be understood that if downlink information is sent to the terminal device on a part or all of time domain resources between the time domain resource for the first channel and the time domain resource for the second channel, or downlink information is sent to the terminal device on a time domain resource overlapping the time domain resource for the first channel, or downlink information is sent to the terminal device on a time-frequency resource overlapping the time domain resource for the second channel, uplink transmit power of the terminal device may change. Consequently, uplink transmit power of the terminal device on the first channel is different from uplink transmit power of the terminal device on the second channel, and a same DMRS cannot be used for demodulation on the first channel and the second channel, that is, the DMRS cannot be shared. Herein, the downlink information may be semi-persistent scheduling-based downlink information, or may be scheduling-based downlink information. This is not limited in this embodiment of this application.

It should be noted that, when the terminal device sends the third channel or receives the fifth channel, uplink information may be transmitted on each of the first channel and the second channel in the scheduling-based transmission mode, or uplink information may be transmitted on the first channel and the second channel separately in the scheduling-based transmission mode and the configured grant-based transmission mode. This is not limited in this embodiment of this application.

Optionally, in this embodiment of this application, the first information includes the first DCI, the second information includes the second DCI, and a DCI format identifier in each of the first DCI and the second DCI is 1; or the first information includes the first configuration information, the second information includes the second DCI, a DCI format identifier in the second DCI is 1, and the first configuration information is used to configure semi-persistent scheduling-based downlink transmission; or the second information includes the second configuration information, the first information includes the first DCI, a DCI format identifier in the first DCI is 1, and the second configuration information is used to configure semi-persistent scheduling-based downlink transmission.

It should be noted that a DCI format identifier of DCI is 1 indicates that the DCI is used to indicate transmission of downlink information.

Optionally, in this embodiment of this application, for the downlink information transmission, the terminal device discards the second information when at least one of Option 15 to Option 17 is met. Alternatively, in an optional embodiment, the first condition described above further includes at least one of the following conditions: Option 15 to Option 17.

Option 15: Transmission configuration indication information indicated by the second information is different from transmission configuration indication information indicated by the first information.

Transmission configuration indication (TCI) information is introduced into DCI or configuration information that is used to indicate the uplink information transmission. Indication information of different TCIs corresponds to different reference signals. This is because, the terminal device assumes that a current reference signal is a reference signal indicated in the TCI.

It may be understood that, when the first information indicates transmission of the first DMRS, and indicates that a corresponding TCI is a first TCI, and the second information indicates transmission of the second DMRS, and indicates that a corresponding TCI is a second TCI, it means that the two DMRSs are different. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Option 16: Physical resource block (PRB) bundling size indicator information indicated by the second information is different from physical resource block bundling size indicator (PRB bundling size indicator) information indicated by the first information.

Physical resource block bundling size indicator information is introduced into DCI or configuration information used to indicate the uplink information transmission, and different physical resource block bundling size indicator information corresponds to different methods for using a reference signal. Herein, the terminal device may use a physical resource block bundling size as a minimum granularity for performing channel estimation by using a reference signal.

It may be understood that, when the first information indicates transmission of the first DMRS, and indicates that the physical resource block bundling size indicator information is first physical resource block bundling size indicator information, and the second information indicates transmission of the second DMRS, and indicates that the physical resource block bundling size indicator information is second physical resource block bundling size indicator information, it means that processing methods for the two DMRSs are different. When the time-frequency resource for the first DMRS overlaps the time-frequency resource for the second DMRS, the terminal device cannot simultaneously perform different processing on the two DMRSs to obtain results of channel estimation. If the DMRSs are used based on the indications of the first information and the second information, a behavior error of the terminal device is caused. Therefore, the terminal device may discard the second information.

Option 17: Frequency hopping information indicated by the second information is different from frequency hopping information indicated by the first information.

Frequency hopping information is introduced into DCI or configuration information that is used to indicate the uplink information transmission, and the frequency hopping information may be a frequency hopping flag frequency hopping flag. For example, when a value of the frequency hopping flag is 1, it indicates that frequency hopping is to be performed; or when a value of the frequency hopping flag is 0, it indicates that frequency hopping is not to be performed. If the frequency hopping flag indicates that frequency hopping is to be performed, a frequency domain resource for information changes for one or more times in one information transmission process. If the frequency hopping flag indicates that frequency hopping is not to be performed, a frequency domain resource for information remains unchanged in one information transmission process.

It may be understood that, when the first information indicates to perform frequency hopping when indicating transmission of the first DMRS, and the second information indicates not to perform frequency hopping when indicating transmission of the second DMRS, it means that frequency domain resources for the two DMRS transmissions are different. When the time domain resource for the first DMRS overlaps the time domain resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Optionally, in this embodiment of this application, when the first channel and the second channel are downlink channels, the method 200 further includes: receiving, by the terminal device, a fourth channel, where the fourth channel is used to carry semi-persistent scheduling-based downlink information. Optionally, the terminal device discards the second information when at least one of the following conditions, namely, Option 18 to Option 20, is met. Alternatively, optionally, the first condition described above further includes at least one of the following conditions: Option 18 to Option 20.

Option 18: A time domain resource for the fourth channel is between the time domain resource for the first channel and the time domain resource for the second channel. In this case, a relationship among time domain positions of the fourth channel, the first channel, and the second channel is similar to a relationship among time domain positions of the third channel, the first channel, and the second channel in FIG. 6. For details, refer to the descriptions in FIG. 6, and details are not described herein again.

Option 19: A time domain resource for the fourth channel overlaps the time domain resource for the first channel. In this case, a relationship among time domain positions of the fourth channel, the first channel, and the second channel is similar to a relationship among time domain positions of the third channel, the first channel, and the second channel in FIG. 7. For details, refer to the descriptions in FIG. 7, and details are not described herein again.

Option 20: A time domain resource for the fourth channel overlaps the time domain resource for the second channel. In this case, a relationship among time domain positions of the fourth channel, the first channel, and the second channel is similar to a relationship among time domain positions of the third channel, the first channel, and the second channel in FIG. 8. For details, refer to the descriptions in FIG. 8, and details are not described herein again.

It may be understood that if semi-persistent scheduling-based downlink information is sent to the terminal device on a part or all of time domain resources between the time domain resource for the first channel and the time domain resource for the second channel, or semi-persistent scheduling-based downlink information is sent to the terminal device on a time domain resource overlapping the time domain resource for the first channel, or semi-persistent scheduling-based downlink information is sent to the terminal device on a time-frequency resource overlapping the time domain resource for the second channel, downlink transmit power of the network device may change. Consequently, downlink transmit power of the network device on the first channel is different from downlink transmit power of the network device on the second channel, and a same DMRS cannot be used for demodulation on the first channel and the second channel, that is, the DMRS cannot be shared.

Optionally, when the first channel and the second channel are downlink channels, the method 200 may further include: sending, by the terminal device, a sixth channel, where the sixth channel is used to carry configured grant-based uplink information, or is used to carry scheduling-based uplink information.

Optionally, in this embodiment of this application, the terminal device may discard the second information when at least one of Option 21 to Option 23 is met. Alternatively, optionally, the first condition described above may further include at least one of the following conditions: Option 21 to Option 23.

Option 21: A time domain resource for the sixth channel is between the time domain resource for the first channel and the time domain resource for the second channel. In this case, a relationship among time domain positions of the sixth channel, the first channel, and the second channel is similar to a relationship among time domain positions of the third channel, the first channel, and the second channel in FIG. 6. For details, refer to the descriptions in FIG. 6, and details are not described herein again.

Option 22: A time domain resource for the sixth channel overlaps the time domain resource for the first channel. In this case, a relationship among time domain positions of the sixth channel, the first channel, and the second channel is similar to a relationship among time domain positions of the third channel, the first channel, and the second channel in FIG. 7. For details, refer to the descriptions in FIG. 7, and details are not described herein again.

Option 23: A time domain resource for the sixth channel overlaps the time domain resource for the second channel. In this case, a relationship among time domain positions of the sixth channel, the first channel, and the second channel is similar to a relationship among time domain positions of the third channel, the first channel, and the second channel in FIG. 8. For details, refer to the descriptions in FIG. 8, and details are not described herein again.

Optionally, the first channel, the second channel, and the sixth channel correspond to a same band band.

Optionally, a serving cell in which the first channel, the second channel, and the sixth channel are located is a first serving cell. Different moments in the first serving cell include an uplink moment and a downlink moment. The uplink moment includes at least one symbol, and the downlink moment includes at least one symbol. The uplink moment and the downlink moment may be predefined or may be configured by using higher layer signaling.

Optionally, a BWP in which the first channel, the second channel, and the sixth channel are located is a first BWP. Different moments in the first BWP include an uplink moment and a downlink moment. The uplink moment includes at least one symbol, and the downlink moment includes at least one symbol. The uplink moment and the downlink moment may be predefined or may be configured by using higher layer signaling.

It may be understood that if the terminal device sends uplink information on a part or all of time domain resources between the time domain resource for the first channel and the time domain resource for the second channel, or the terminal device sends uplink information on a time domain resource overlapping the time domain resource for the first channel, or the terminal device sends uplink information on a time-frequency resource overlapping the time domain resource for the second channel, downlink transmit power of the network device may change. Consequently, downlink transmit power of the network device on the first channel is different from downlink transmit power of the network device on the second channel, and a same DMRS cannot be used for demodulation on the first channel and the second channel, that is, the DMRS cannot be shared. Herein, the uplink information may be configured grant-based uplink information, or may be scheduling-based uplink information. This is not limited in this embodiment of this application.

It should be noted that, when the terminal device receives the fourth channel or sends the sixth channel, uplink information may be transmitted on each of the first channel and the second channel in the scheduling-based transmission mode, or uplink information may be transmitted on the first channel and the second channel separately in the scheduling-based transmission mode and the configured grant-based transmission mode. This is not limited in this embodiment of this application.

Optionally, in this embodiment of this application, when the first information includes the first DCI, and the second information includes the second DCI, the terminal device discards the second information when at least one of the following conditions, namely, Option 24 to Option 27, is met. Alternatively, optionally, the first condition may further include at least one of Option 24 to Option 27.

Option 24: The first DCI is scrambled by using a first radio network temporary identifier (RNTI), the second DCI is scrambled by using a second RNTI, and the first RNTI is different from the second RNTI.

In an NR system, currently, when generating DCI, the network device first scrambles the DCI by using an RNTI. The terminal device may identify a format or content of received DCI by using the RNTI. Further, different RNTIs may further be introduced into the NR system for different service types or use scenarios. For example, the first RNTI corresponds to an ultra-reliable low-latency communication (URLLC) service, and the second RNTI corresponds to an enhanced mobile broadband (eMBB) service. For another example, the first RNTI corresponds to a high-speed scenario, and the second RNTI corresponds to a low-speed scenario. In this case, when RNTIs are different, it may be considered that content, formats, or purposes indicated in the DCI is/are different. In this embodiment of this application, the high-speed scenario is a scenario of high-speed movement, and the low-speed scenario is a scenario of low-speed movement.

It may be understood that when the first DCI is scrambled by using the first RNTI, and the second DCI is scrambled by using the second RNTI, it indicates that content, formats, or purposes indicated in the DCI transmitted twice is/are different. In this case, it may be considered that DMRS information transmitted twice is different. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information. Optionally, the terminal device may further determine, based on the RNTIs, importance of the information, to further determine that the second information may be discarded.

Optionally, modulation and coding scheme (MCS) information in the DCI scrambled by using the first RNTI corresponds to a first MCS table, and the first MCS table includes MCS information including spectral efficiency being 0.0586. The second RNTI is an RNTI such as a cell radio network temporary identifier (C-RNTI) other than the first RNTI. The first MCS table may be Table 1 or Table 2 shown below. It can be learned that an MCS index corresponding to the spectral efficiency being 0.0586 in Table 1 or Table 2 is 0. The foregoing is merely an example. In another example, the MCS information including the spectral efficiency being 0.0586 may alternatively be represented in another form. This is not limited in this embodiment of this application.

A value of q in Table 2 may be 1 or 2 based on higher layer signaling. In some examples, the first RNTI may be an MCS-C-RNTI. The MCS-C-RNTI may indicate lower spectral efficiency, that is, may be used in high-reliability transmission. Therefore, the DCI scrambled by using the first RNTI may be used to implicitly notify the terminal device that the information is important or urgent, and the second information needs to be discarded, where the second information includes the second DCI scrambled by using the second RNTI.

TABLE 1

| MCS index $I_{MCS}$ | Modulation order $Q_m$ | Target coding rate Rx[1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | Reserved | |
| 30 | 4 | Reserved | |
| 31 | 6 | Reserved | |

TABLE 2

| MCS index $I_{MCS}$ | Modulation order $Q_m$ | Target coding rate Rx[1024] | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | Reserved | |

TABLE 2-continued

| MCS index $I_{MCS}$ | Modulation order $Q_m$ | Target coding rate Rx[1024] | Spectral efficiency |
|---|---|---|---|
| 29 | 2 | Reserved | |
| 30 | 4 | Reserved | |
| 31 | 6 | Reserved | |

Option 25: A format of the first DCI is a first format, a format of the second DCI is a second format, and the first format is different from the second format.

Different DCI formats indicate that DCI includes different indication information and/or corresponds to different quantities of bits. Different formats may further be introduced into an NR system for different service types or use scenarios. For example, the first format corresponds to a URLLC service, and the second format corresponds to an eMBB service. For another example, the first format corresponds to a high-speed scenario, and the second format corresponds to a low-speed scenario. In this case, when formats are different, it may be considered that content or purposes indicated in the DCI is/are different.

It may be understood that when the DCI formats of the first DCI and the second DCI are different, it indicates that content or purposes indicated in the DCI transmitted twice is/are different. In this case, it may be considered that DMRS information transmitted twice is different. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information. Optionally, the terminal device may further determine, based on the DCI formats, importance of the information, to further determine that the second information may be discarded.

Optionally, the first DC is in a DCI format in which a quantity of bits is less than or equal to C1. C1 is a positive integer greater than or equal to 8. For example, C1 is one of 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40. The second DCI is in a DCI format in which a quantity of bits is greater than C1. Optionally, C1 is less than or equal to 40.

Option 26: Search space in which the first DCI is located is first search space, search space in which the second DCI is located is second search space, and the first search space is different from the second search space.

Different search space indicates that DCI includes different indication information and/or corresponds to different quantities of bits. Different search space may further be introduced into an NR system for different service types or use scenarios. For example, the first search space (for example, user search space) corresponds to a URLLC service, and the second format (for example, common search space) corresponds to an eMBB service. For another example, the first search space corresponds to a high-speed scenario, and the second search space corresponds to a low-speed scenario. In this case, when search space is different, it may be considered that content or purposes indicated in the DCI is/are different.

It may be understood that when the search space of the first DCI is different from the search space of the second DCI, it indicates that content, formats, or purposes indicated in the DCI transmitted twice is/are different. In this case, it may be considered that DMRS information transmitted twice is different. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Optionally, the terminal device determines, based on the search space, importance of the information, to further determine that the second information may be discarded. In an optional embodiment, usually, a frequency at which the search space is the common search space is lower, and a frequency at which the search space is the user search space is higher. Therefore, the second DCI may correspond to the common search space, and the first DCI may correspond to the user search space. Therefore, the first DCI corresponding to the user search space may be used to implicitly notify the terminal device that the information is important or urgent, and the second information needs to be discarded, where the second information includes the second DCI corresponding to the common search space.

Option 27: A physical downlink control channel PDCCH monitoring periodicity corresponding to the first DCI is a first PDCCH monitoring periodicity, a PDCCH monitoring periodicity corresponding to the second DCI is a second PDCCH monitoring periodicity, and the first PDCCH monitoring periodicity is different from the second PDCCH monitoring periodicity.

Different PDCCH monitoring periodicities each indicate whether a service corresponding to a PDCCH is latency-sensitive. Different PDCCH monitoring periodicities may further be introduced into an NR system for different service types or use scenarios. For example, the first PDCCH monitoring periodicity corresponds to a URLLC service, and the first PDCCH monitoring periodicity may be less than or equal to a first threshold. The second PDCCH monitoring periodicity corresponds to an eMBB service, and the second PDCCH monitoring periodicity is greater than the first threshold. For another example, the first PDCCH monitoring periodicity corresponds to a high-speed scenario, and the second PDCCH monitoring periodicity corresponds to a low-speed scenario. In this case, when PDCCH monitoring periodicities are different, it may be considered that content or purposes indicated in the DCI is/are different.

It may be understood that when the PDCCH monitoring periodicities corresponding to the first information and the second information are different, it indicates that content, formats, or purposes indicated in the DCI transmitted twice is/are different. In this case, it may be considered that DMRS information transmitted twice is different. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information. Optionally, the terminal device determines, based on the PDCCH monitoring periodicities, importance of the information, to further determine that the second information may be discarded.

Optionally, in this embodiment of this application, when the second information includes the second DCI, the first condition further includes at least one of the following conditions: Option 28 to Option 31. Herein, the first information may be the first DCI or the first configuration information. This is not limited in this embodiment of this application.

Option 28: The second DCI is scrambled by using a second radio network temporary identifier RNTI.

The second RNTI herein is an RNTI corresponding to a specific service type or use scenario, for example, an RNTI corresponding to an eMBB service or an RNTI corresponding to a low-speed scenario. Therefore, in this embodiment of this application, when the second DCI is scrambled by using the second RNTI, that the terminal device discards the second information may be understood as that the terminal device discards DCI corresponding to a specific service type or a specific use scenario. On the contrary, if the second DCI is scrambled by using an RNTI (for example, an RNTI corresponding to a URLLC service or an RNTI corresponding to a high-speed scenario) other than the second RNTI, the terminal device does not need to discard the second information.

Option 29: A format of the second DCI is a second format.

The DCI in the second format herein is in a DCI format corresponding to a specific service type or use scenario, for example, a DCI format corresponding to an eMBB service or a DCI format corresponding to a low-speed scenario. Therefore, in this embodiment of this application, when the second DCI is in the second format, that the terminal device discards the second information may be understood as that the terminal device discards DCI corresponding to a specific service type or a specific use scenario. On the contrary, if the format of the second DCI is a format (for example, a DCI format corresponding to a URLLC service or a DCI format corresponding to a high-speed scenario) other than the second format, the terminal device does not need to discard the second information.

Option 30: Search space in which the second DCI is located is second search space.

The second search space herein is search space corresponding to a specific service type or use scenario, for example, search space corresponding to an eMBB service or search space corresponding to a low-speed scenario. Therefore, in this embodiment of this application, when the search space in which the second DCI is located is the second search space, that the terminal device discards the second information may be understood as that the terminal device discards DCI corresponding to a specific service type or a specific use scenario. On the contrary, if the search space in which the second DCI is located is search space (for example, search space corresponding to a URLLC service or search space corresponding to a high-speed scenario) other than the second search space, the terminal device does not need to discard the second information.

Option 31: A physical downlink control channel PDCCH monitoring periodicity corresponding to the second DCI is a second PDCCH monitoring periodicity.

The second PDCCH monitoring periodicity herein is a monitoring periodicity corresponding to a specific service type or use scenario, for example, a monitoring periodicity corresponding to an eMBB service or a monitoring periodicity corresponding to a low-speed scenario. Therefore, in this embodiment of this application, when the PDCCH monitoring periodicity corresponding to the second DCI is the second monitoring periodicity, that the terminal device discards the second information may be understood as that the terminal device discards DCI corresponding to a specific service type or a specific use scenario. On the contrary, if the PDCCH monitoring periodicity corresponding to the second DCI is a PDCCH monitoring periodicity (for example, a PDCCH monitoring periodicity corresponding to a URLLC service or a PDCCH monitoring periodicity corresponding to a high-speed scenario) other than the second PDCCH monitoring periodicity, the terminal device does not need to discard the second information.

In other words, in Option 28 to Option 31 in this embodiment of this application, the terminal device may determine, based on an attribute of the second information instead of an attribute of the first information, whether to discard the second information.

Optionally, in this embodiment of this application, the terminal device may determine, in combination with at least one of Option 28 to Option 31 and another condition in this embodiment of this application, whether to discard the second information.

For example, when the first information includes the first DCI, the second information includes the second DCI, and the first DCI and the second DCI meet at least one of Option 1 to Option 3, it indicates that the first DCI is different from the second DCI. In this case, if the second DCI meets at least one of Option 28 to Option 31, the terminal device discards the second information. If the second DCI does not meet at least one of Option 28 to Option 31, the terminal device may not discard the second information. Optionally, in this case, the terminal device may discard the first information.

For another example, when the first information includes the first configuration information, the second information includes the second DCI, and the first information and the second information meet, for example, at least one of Option 1 to Option 3, if the second DCI meets at least one of Option 28 to Option 31, the terminal device discards the second information. If the second DCI does not meet at least one of Option 28 to Option 31, the terminal device may not discard the second information. Optionally, in this case, the terminal device may discard the first configuration information.

Therefore, the terminal device discards the second information when the second DCI meets at least one of Option 28 to Option 31, and does not discard the second information when the second DCI does not meet at least one of Option 28 to Option 31. When the first information is inconsistent with the second information, service transmission in some specific services or use scenarios (for example, an eMBB service or a low-speed scenario) may be discarded, to meet an information transmission requirement of another specific service or use scenario (for example, a URLLC service or a high-speed scenario).

Optionally, in this embodiment of this application, the terminal device discards the second information when at least one of Option 32 and Option 33 is met. Alternatively, optionally, the first condition may further include at least one of the following conditions: Option 32 and Option 33.

Option 32: Precoding information and number-of-layers information indicated by the second information are different from precoding information and quantity-of-layers information indicated by the first information.

In an NR system, DMRSs corresponding to different precoding information and different quantity-of-layers information correspond to different precoding matrices, in other words, different spatial features. DMRSs corresponding to different precoding information and different quantity-of-layers information may further correspond to different time-frequency resources for DMRSs. Therefore, when the precoding information and the quantity-of-layers information that are indicated by the second information are different from the precoding information and the quantity-of-layers information that are indicated by the first information, the first DMRS is different from the second DMRS. When the time-frequency resource for the first DMRS overlaps the time-frequency resource for the second DMRS, the terminal device cannot simultaneously transmit the two DMRSs. If the DMRSs are transmitted based on the indications of the first information and the second information, a behavior error of the terminal device is caused. Therefore, the terminal device may discard the second information.

Option 33: A frequency domain resource, for the second channel, indicated by the second information is different from a frequency domain resource, for the first channel, indicated by the first information.

Herein, that frequency domain resources are the same means that positions and sizes of two frequency domain resources are the same. Otherwise, if positions or sizes of two frequency domain resources are different, it indicates that the two frequency domain resources are different.

To be specific, when the frequency domain resource, for the second channel, indicated by the second information is different from the frequency domain resource, for the first channel, indicated by the first information, the terminal device may discard the second information.

For a same serving cell, if the time domain resource for the first DMRS overlaps the time domain resource for the second DMRS, the terminal device needs to have a capability of simultaneously transmitting DMRSs on different frequency domain resources. If the terminal device does not have the capability of simultaneously transmitting DMRSs on more than one frequency domain resource, the terminal device cannot simultaneously transmit the two DMRSs. In this case, if the DMRSs are transmitted based on the indications of the first information and the second information, a behavior error of the terminal device is caused. Therefore, the terminal device may discard the second information. Further, if the first information is inconsistent with the second information, frequency domain resources used to transmit the DMRSs twice are different. In this case, a DMRS corresponding to the first channel cannot be used for information demodulation on the second channel.

Optionally, in this embodiment of this application, for the uplink information transmission, the terminal device discards the second information when at least one of Option 34 and Option 35 is met. Alternatively, optionally, for the uplink information transmission, the first condition may further include at least one of the following conditions: Option 34 and Option 35.

Option 34: The terminal device is configured to be in a transmit power command accumulation mode (tpc-Accumulation), and a transmit power command word indicated by the second information is not 1.

Optionally, closed-loop power indication information indicated by the first information is the same as closed-loop power indication information indicated by the second information.

If the terminal device is configured to be in the power command accumulation mode, when a transmit power command TPC word received by the terminal device is 1, it indicates that transmit power, corresponding to the second DMRS, indicated by the second information is not adjusted based on transmit power corresponding to the first DMRS; and when the transmit power command TPC word received by the terminal device is not 1, it indicates that the transmit power, corresponding to the second DMRS, indicated by the second information is adjusted based on the transmit power corresponding to the first DMRS, and consequently, the transmit power corresponding to the first DMRS is different from the transmit power corresponding to the second DMRS. When the time-frequency resource for the first DMRS overlaps the time-frequency resource for the second DMRS, the terminal device cannot simultaneously transmit the two DMRSs corresponding to different transmit power. If the DMRSs are transmitted based on the indications of the first information and the second information, a behavior error of the terminal device is caused. Therefore, the terminal device may discard the second information.

Option 35: The terminal device is configured to be in a non-transmit power command accumulation mode, and a transmit power command word indicated by the second information is different from a transmit power command word indicated by the first information.

If the terminal device is configured to be in the non-transmit power command accumulation mode, an absolute power adjustment value is notified each time by using a transmit power command word.

It may be understood that, when the transmit power command word indicated by the first information is different from the transmit power command word indicated by the second information, transmit power at which the DMRSs are transmitted twice is different. When the time-frequency resource for the first DMRS overlaps the time-frequency resource for the second DMRS, the terminal device cannot simultaneously transmit the two DMRSs corresponding to different transmit power. If the DMRSs are transmitted based on the indications of the first information and the second information, a behavior error of the terminal device is caused. Therefore, the terminal device may discard the second information.

Herein, that the terminal device is configured to be in the non-transmit power command accumulation mode may alternatively be equivalently replaced with that the terminal device is not configured to be in a power command accumulation mode.

Optionally, in this embodiment of this application, the first condition may include at least one of Option 1 to Option 35. In other words, the terminal device may determine, based on at least one of the foregoing conditions, namely, Option 1 to Option 35, whether to discard the second information. In an example, the terminal device may first determine whether the first information and the second information meet a first part of conditions in Option 1 to Option 35, and may discard the second information when the first information and the second information meet the first part of conditions. When determining that the first information and the second information do not meet the first part of conditions, the terminal device may continue to determine whether the first information and the second information meet a second part of conditions in Option 1 to Option 35, and may discard the second information when the first information and the second information meet the second part of conditions. Herein, the first part of conditions are at least one of Option 1 to Option 35, and the second part of conditions are at least one of Option 1 to Option 35 other than the first part of conditions.

In an optional embodiment, when the first information includes the first DCI, and the second information includes the second DCI, the terminal device may determine, based on at least one the foregoing conditions, namely, Option 1 to Option 3 and Option 24 to Option 27, whether to discard the second information.

In an example, the terminal device may first determine, based on at least one of Option 24 to Option 27, whether to discard the second information. In a possible implementation, the terminal device may discard the second information when at least one of Option 24 to Option 27 is met. In another possible implementation, after it is determined based on at least one of Option 24 to Option 27 that the second information is not to be discarded, whether to discard the second information may continue to be determined based on at least one of Option 1 to Option 3.

In another example, the terminal device may first determine, based on at least one of Option 1 to Option 3, whether to discard the second information. In a possible implementation, the terminal device may discard the second information when at least one of Option 1 to Option 3 is met. In another possible implementation, after it is determined based on at least one of Option 1 to Option 3 that the second information is not to be discarded, whether to discard the second information may continue to be determined based on at least one of Option 24 to Option 27.

It may be understood that, in this embodiment of this application, if determining that the first information and the second information do not meet at least one of Option 1 to Option 35, the terminal device may not discard the second information. It should be noted that when the first information and the second information do not meet at least one of Option 1 to Option 35, in one case, it may be considered that the DMRS information indicated by the first information and the second information is the same, and/or information transmit power, on the first channel, indicated by the first information is the same as information transmit power, on the second channel, indicated by the second information, and/or information transmit power, in a first time unit, indicated by the first information is the same as information transmit power, in a second time unit, indicated by the second information, and the terminal device discards neither the first information nor the second information; or in another case, the DMRS information indicated by the first information and the second information is different, and/or information transmit power, on the first channel, indicated by the first information is different from information transmit power, on the second channel, indicated by the second information, and/or information transmit power, in a first time unit, indicated by the first information is different from information transmit power, in a second time unit, indicated by the second information, and the terminal device may not discard the second information, but discard the first information.

Therefore, in this embodiment of this application, when the first information and the second information meet at least one of Option 1 to Option 35, if the terminal device transmits the DMRSs based on the indications of the first information and the second information, the behavior error of the terminal device is caused, and further, demodulation performance on a channel is reduced or a demodulation error on a channel is caused. In this case, the terminal device may discard the second information and comply with the indication of the first information, thereby improving the demodulation performance on the channel. Further, when the first information is inconsistent with the second information, the second information is discarded, so that a DMRS, corresponding to the first channel, indicated by the first information can be used to demodulate information on the second channel indicated by the second information, and the DMRS corresponding to the first channel is shared with the second channel. Therefore, performance of demodulation on the second channel is not affected.

Optionally, in this embodiment of this application, when determining that the first information and the second information meet at least one of Option 1 to Option 35, the terminal device may always discard information that is transmitted later in the first information and the second information, or may always discard the configuration information in the first information and the second information, or may always discard dynamic scheduling information, for example, the DCI, in the first information and the second information. This is not limited in this embodiment of this application.

Figure 9:
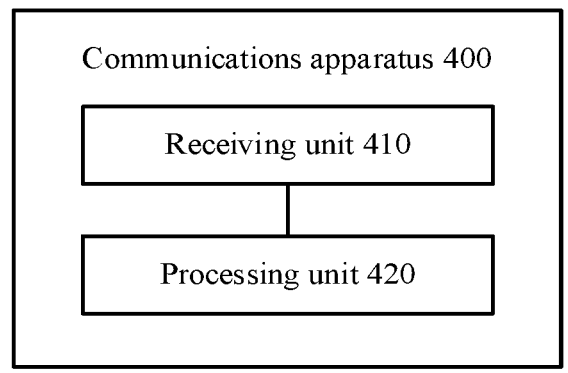
FIG. 9 is a schematic block diagram of a communications apparatus according to an embodiment of this application.

FIG. 9 is a schematic block diagram of a communications apparatus 400 according to an embodiment of this application. The communications apparatus 400 may be the terminal device in FIG. 2, or may be a communications chip in the terminal device. This is not limited in this embodiment of this application. The communications apparatus includes a receiving unit 410 and a processing unit 420.

The receiving unit 410 is configured to receive first information, where the first information is used to indicate a time-frequency resource for a first demodulation reference signal DMRS.

The receiving unit 410 is further configured to receive second information, where the second information is used to indicate a time-frequency resource for a second DMRS, the time-frequency resource for the second DMRS completely or partially overlaps the time-frequency resource for the first DMRS, and the first information includes first downlink control information DCI and the second information includes second DCI, or the first information includes first configuration information and the second information includes second DCI, or the first information includes first DCI and the second information includes second configuration information, where both the first configuration information and the second configuration information are higher layer signaling.

The processing unit 420 is configured to discard the second information when a first condition is met, where the first condition includes at least one of the following conditions:
  bandwidth part indication information indicated by the second information is different from bandwidth part indication information indicated by the first information;
  antenna port information indicated by the second information is different from antenna port information indicated by the first information; and
  DMRS sequence initialization information indicated by the second information is different from DMRS sequence initialization information indicated by the first information.

Therefore, in this embodiment of this application, when the first information and the second information meet the first condition, if the terminal device transmits the DMRSs based on indications of the first information and the second information, a behavior error of the terminal device is caused, and further, demodulation performance on a channel is reduced or a demodulation error on a channel is caused. In this case, the terminal device may discard the second information and comply with the indication of the first information, thereby improving the demodulation performance on the channel. Further, when the first information is inconsistent with the second information, the second information is discarded, so that a DMRS, corresponding to a first channel, indicated by the first information can be used to demodulate information on a second channel indicated by the second information, and the DMRS corresponding to the first channel is shared with the second channel. Therefore, performance of demodulation on the second channel is not affected.

Optionally, in this embodiment of this application, the first information includes the first DCI, the second information includes the second DCI, and a DCI format identifier in each of the first DCI and the second DCI is 0; or
  the first information includes the first configuration information, the second information includes the second DCI, a DCI format identifier in the second DCI is 0, and the first configuration information is used to configure uplink transmission without dynamic grant; or
  the second information includes the second configuration information, the first information includes the first DCI, a DCI format identifier in the first DCI is 0, and the second configuration information is used to configure uplink transmission without dynamic grant.

Optionally, in this embodiment of this application, the first condition further includes at least one of the following conditions:
  uplink indication information and supplementary uplink indication information that are indicated by the second information are different from uplink indication information and supplementary uplink indication information that are indicated by the first information;
  frequency hopping information indicated by the second information is different from frequency hopping information indicated by the first information;
  a phase-tracking reference signal PTRS-demodulation reference signal DMRS association indicated by the second information is different from a PTRS-DMRS association indicated by the first information;
  closed-loop power control indication information indicated by the second information is different from closed-loop power control indication information indicated by the first information; and
  transform precoder information indicated by the second information is different from transform precoder information indicated by the first information.

Optionally, in this embodiment of this application, the first information is further used to indicate a time domain resource for a first channel, the second information is further used to indicate a time domain resource for a second channel, and the communications apparatus 400 further includes:
  a sending unit, configured to send a third channel, where the third channel is used to carry configured grant-based uplink transmission, where
  the first condition further includes at least one of the following conditions:
  a time domain resource for the third channel is between the time domain resource for the first channel and the time domain resource for the second channel;
  the time domain resource for the third channel partially or completely overlaps the time domain resource for the first channel; and
  the time domain resource for the third channel partially or completely overlaps the time domain resource for the second channel.

Optionally, in this embodiment of this application, the first information includes the first DCI, the second information includes the second DCI, and a DCI format identifier in each of the first DCI and the second DCI is 1; or
  the first information includes the first configuration information, the second information includes the second DCI, a DCI format identifier in the second DCI is 1, and the first configuration information is used to configure semi-persistent scheduling-based downlink transmission; or
  the second information includes the second configuration information, the first information includes the first DCI, a DCI format identifier in the first DCI is 1, and the second configuration information is used to configure semi-persistent scheduling-based downlink transmission.

Optionally, in this embodiment of this application, the first condition further includes at least one of the following conditions:
   transmission configuration indication information indicated by the second information is different from transmission configuration indication information indicated by the first information;
   physical resource block bundling size indicator information indicated by the second information is different from physical resource block bundling size indicator information indicated by the first information; and
   frequency hopping information indicated by the second information is different from frequency hopping information indicated by the first information.

Optionally, in this embodiment of this application, the first information is further used to indicate a time domain resource for a first channel, the second information is further used to indicate a time domain resource for a second channel, and the receiving unit 410 is further configured to receive a fourth channel, where the fourth channel is used to carry semi-persistent scheduling-based downlink information, where
   the first condition further includes at least one of the following conditions:
   a time domain resource for the fourth channel is between the time domain resource for the first channel and the time domain resource for the second channel;
   the time domain resource for the fourth channel partially or completely overlaps the time domain resource for the first channel; and
   the time domain resource for the fourth channel partially or completely overlaps the time domain resource for the second channel.

Optionally, in this embodiment of this application, the first information includes the first DCI, the second information includes the second DCI, and the first condition further includes at least one of the following conditions:
   the first DCI is scrambled by using a first radio network temporary identifier RNTI, the second DCI is scrambled by using a second RNTI, and the first RNTI is different from the second RNTI;
   a format of the first DCI is a first format, a format of the second DCI is a second format, and the first format is different from the second format;
   search space in which the first DCI is located is first search space, search space in which the second DCI is located is second search space, and the first search space is different from the second search space; and
   a physical downlink control channel PDCCH monitoring periodicity corresponding to the first DCI is a first PDCCH monitoring periodicity, a PDCCH monitoring periodicity corresponding to the second DCI is a second PDCCH monitoring periodicity, and the first PDCCH monitoring periodicity is different from the second PDCCH monitoring periodicity.

Optionally, in this embodiment of this application, the second information includes the second DCI, and the first condition further includes at least one of the following conditions:
   the second DCI is scrambled by using a second radio network temporary identifier RNTI;
   a format of the second DCI is a second format;
   search space in which the second DCI is located is second search space; and
   a physical downlink control channel PDCCH monitoring periodicity corresponding to the second DCI is a second PDCCH monitoring periodicity.

Figure 10:
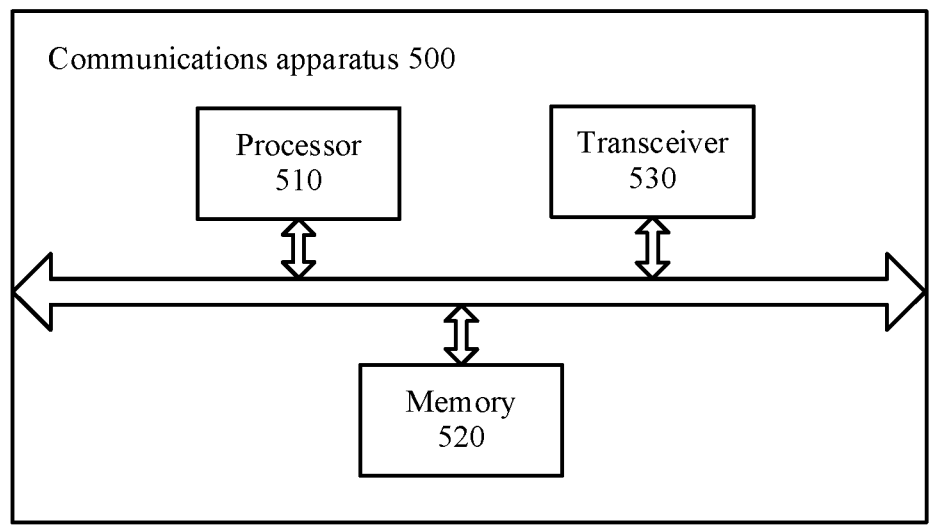
FIG. 10 is a schematic block diagram of another communications apparatus according to an embodiment of this application.

It should be noted that in this embodiment of this application, the receiving unit 410 may be implemented by a transceiver or a transceiver circuit, and the processing unit 420 may be implemented by a processor. As shown in FIG. 10, a communications apparatus 500 may include a processor 510 and a transceiver 530, and optionally, may further include a memory 520. The memory 520 may be configured to store code executed by the processor 510 and the like. The processor 510 may be configured to process data or a program. The transceiver 530 may be implemented by a transceiver circuit, and is configured to implement a function of sending information to or receiving information from another module or communications entity.

In an implementation process, the steps or operations in the foregoing methods may be implemented by using a hardware integrated logic circuit in the processor 510, or by using instructions in a form of software. The steps or operations in the methods disclosed with reference to the embodiments of this application may be directly performed and completed through a hardware processor, or may be performed and completed through a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory 520. The processor 510 reads information from the memory 520, and completes the steps or operations in the foregoing methods in combination with the hardware. To avoid repetition, details are not described herein again.

The communications apparatus 400 shown in FIG. 9 or the communications apparatus 500 shown in FIG. 10 can implement processes corresponding to the terminal device in the foregoing method embodiments. For the communications apparatus 400 or the communications apparatus 500, refer to the foregoing descriptions of the terminal device. To avoid repetition, details are not described herein again.

An embodiment of this application further provides a computer-readable medium, configured to store a computer program. The computer program includes an instruction used to perform the corresponding method in the foregoing method embodiments.

An embodiment of this application further provides a computer program product. The computer program product includes computer program code. When the computer program code is run, the corresponding method in any one of the foregoing method embodiments is implemented.

The embodiments in this application may be separately or jointly used. This is not limited herein.

It should be understood that descriptions such as "first" and "second" in the embodiments of this application are merely used for indicating and distinguishing between described objects, do not show a sequence, do not indicate that a quantity of devices is limited in the embodiments of this application, and cannot constitute any limitation on the embodiments of this application.

It should further be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, units and algorithm steps or operations in the examples described with reference to the embodiments disclosed in this application can be implemented by electronic hardware or a combination of electronic hardware and computer software. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, in other words, may be located at one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps or operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In the embodiments of this application, unless otherwise stated or there is a logic conflict, terms and/or descriptions between different embodiments are consistent and may be mutually referenced, and technical features in different embodiments may be combined according to an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between associated objects.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information processing method, performed by a terminal, comprising:
   receiving first information that indicates a first time-frequency resource for a first demodulation reference signal (DMRS);
   receiving second information that indicates a second time-frequency resource for a second DMRS, the second time-frequency resource at least partially overlapping the first time-frequency resource, the first information comprising one of first downlink control information (DCI) or first configuration information, and the second information comprising second DCI or second configuration information, wherein each of the first configuration information and the second configuration information is a higher layer signaling; and
   discarding the second information when a first condition is met, wherein the first condition comprises at least one of the following conditions:
      bandwidth part indication information indicated by the second information is different from bandwidth part indication information indicated by the first information;
      antenna port information indicated by the second information is different from antenna port information indicated by the first information; or
      DMRS sequence initialization information indicated by the second information is different from DMRS sequence initialization information indicated by the first information.

2. The method according to claim 1, wherein
   the first information comprises the first DCI, the second information comprises the second DCI, and a DCI format identifier in each of the first DCI and the second DCI is 0; or
   the first information comprises the first configuration information, the second information comprises the second DCI, a DCI format identifier in the second DCI is 0, and the first configuration information is used to configure uplink transmission without dynamic grant; or
   the second information comprises the second configuration information, the first information comprises the first DCI, a DCI format identifier in the first DCI is 0, and the second configuration information is used to configure uplink transmission without dynamic grant.

3. The method according to claim 2, wherein the first condition further comprises at least one of the following conditions:

uplink indication information and supplementary uplink indication information that are indicated by the second information are different from uplink indication information and supplementary uplink indication information that are indicated by the first information;

frequency hopping information indicated by the second information is different from frequency hopping information indicated by the first information;

a phase-tracking reference signal (PTRS)-demodulation reference signal (DMRS) association indicated by the second information is different from a PTRS-DMRS association indicated by the first information;

closed-loop power control indication information indicated by the second information is different from closed-loop power control indication information indicated by the first information; and transform precoder information indicated by the second information is different from transform precoder information indicated by the first information.

4. The method according to claim 2, wherein the first information is further used to indicate a time domain resource for a first channel, the second information is further used to indicate a time domain resource for a second channel, and the method further comprises:

sending a third channel, wherein the third channel is used to carry configured grant-based uplink transmission, wherein the first condition further comprises at least one of the following conditions:

a time domain resource for the third channel is between the time domain resource for the first channel and the time domain resource for the second channel;

the time domain resource for the third channel partially or completely overlaps the time domain resource for the first channel; and the time domain resource for the third channel partially or completely overlaps the time domain resource for the second channel.

5. The method according to claim 1, wherein
the first information comprises the first DCI, the second information comprises the second DCI, and a DCI format identifier in each of the first DCI and the second DCI is 1; or
the first information comprises the first configuration information, the second information comprises the second DCI, a DCI format identifier in the second DCI is 1, and the first configuration information is used to configure semi-persistent scheduling-based downlink transmission; or
the second information comprises the second configuration information, the first information comprises the first DCI, a DCI format identifier in the first DCI is 1, and the second configuration information is used to configure semi-persistent scheduling-based downlink transmission.

6. The method according to claim 5, wherein the first condition further comprises at least one of the following conditions:

transmission configuration indication information indicated by the second information is different from transmission configuration indication information indicated by the first information;

physical resource block bundling size indicator information indicated by the second information is different from physical resource block bundling size indicator information indicated by the first information; and frequency hopping information indicated by the second information is different from frequency hopping information indicated by the first information.

7. The method according to claim 5, wherein the first information is further used to indicate a time domain resource for a first channel, the second information is further used to indicate a time domain resource for a second channel, and the method further comprises:

receiving a fourth channel, wherein the fourth channel is used to carry semi-persistent scheduling-based downlink information, wherein the first condition further comprises at least one of the following conditions:

a time domain resource for the fourth channel is between the time domain resource for the first channel and the time domain resource for the second channel;

the time domain resource for the fourth channel partially or completely overlaps the time domain resource for the first channel; and the time domain resource for the fourth channel partially or completely overlaps the time domain resource for the second channel.

8. A communications apparatus, comprising:
one or more processors; and
a non-transitory computer readable medium storing a program to be executed by the one or more processors, the program comprises instructions for:
receiving first information that indicates a first time-frequency resource for a first demodulation reference signal (DMRS);
receiving second information that indicates a second time-frequency resource for a second DMRS, the second time-frequency resource at least partially overlapping the first time-frequency resource, the first information comprising one of first downlink control information (DCI) or first configuration information, and the second information comprising one of second DCI or the second configuration information, wherein each of the first configuration information and the second configuration information is a higher layer signaling; and
discarding the second information when a first condition is met, wherein the first condition comprises at least one of the following conditions:
bandwidth part indication information indicated by the second information is different from bandwidth part indication information indicated by the first information;
antenna port information indicated by the second information is different from antenna port information indicated by the first information; or
DMRS sequence initialization information indicated by the second information is different from DMRS sequence initialization information indicated by the first information.

9. The apparatus according to claim 8, wherein
the first information comprises the first DCI, the second information comprises the second DCI, and a DCI format identifier in each of the first DCI and the second DCI is 0; or
the first information comprises the first configuration information, the second information comprises the second DCI, a DCI format identifier in the second DCI is 0, and the first configuration information is used to configure uplink transmission without dynamic grant; or the second information comprises the second configuration information, the first information comprises the first DCI, a DCI format identifier in the first DCI is 0, and the second configuration information is used to configure uplink transmission without dynamic grant.

10. The apparatus according to claim 9, wherein the first condition further comprises at least one of the following conditions:
uplink indication information and supplementary uplink indication information that are indicated by the second information are different from uplink indication information and supplementary uplink indication information that are indicated by the first information;
frequency hopping information indicated by the second information is different from frequency hopping information indicated by the first information;
a phase-tracking reference signal (PTRS)-demodulation reference signal (DMRS) association indicated by the second information is different from a PTRS-DMRS association indicated by the first information;
closed-loop power control indication information indicated by the second information is different from closed-loop power control indication information indicated by the first information; and
transform precoder information indicated by the second information is different from transform precoder information indicated by the first information.

11. The apparatus according to claim 9, wherein the first information is further used to indicate a time domain resource for a first channel, the second information is further used to indicate a time domain resource for a second channel, and the program further comprises instructions for:
sending a third channel, wherein the third channel is used to carry configured grant-based uplink transmission, wherein
the first condition further comprises at least one of the following conditions:
a time domain resource for the third channel is between the time domain resource for the first channel and the time domain resource for the second channel;
the time domain resource for the third channel partially or completely overlaps the time domain resource for the first channel; and
the time domain resource for the third channel partially or completely overlaps the time domain resource for the second channel.

12. The apparatus according to claim 8, wherein
the first information comprises the first DCI, the second information comprises the second DCI, and a DCI format identifier in each of the first DCI and the second DCI is 1; or
the first information comprises the first configuration information, the second information comprises the second DCI, a DCI format identifier in the second DCI is 1, and the first configuration information is used to configure semi-persistent scheduling-based downlink transmission; or
the second information comprises the second configuration information, the first information comprises the first DCI, a DCI format identifier in the first DCI is 1, and the second configuration information is used to configure semi-persistent scheduling-based downlink transmission.

13. The apparatus according to claim 12, wherein the first condition further comprises at least one of the following conditions:

transmission configuration indication information indicated by the second information is different from transmission configuration indication information indicated by the first information;
physical resource block bundling size indicator information indicated by the second information is different from physical resource block bundling size indicator information indicated by the first information; and
frequency hopping information indicated by the second information is different from frequency hopping information indicated by the first information.

14. The apparatus according to claim 12, wherein the first information is further used to indicate a time domain resource for a first channel, the second information is further used to indicate a time domain resource for a second channel, and the one or more processors are further configured to receive a fourth channel, wherein the fourth channel is used to carry semi-persistent scheduling-based downlink information, wherein
the first condition further comprises at least one of the following conditions:
a time domain resource for the fourth channel is between the time domain resource for the first channel and the time domain resource for the second channel;
the time domain resource for the fourth channel partially or completely overlaps the time domain resource for the first channel; and
the time domain resource for the fourth channel partially or completely overlaps the time domain resource for the second channel.

15. A non-transitory computer-readable medium storing program for use by an apparatus, wherein the program comprises instructions for:
receiving first information that indicates a first time-frequency resource for a first demodulation reference signal (DMRS);
receiving second information that indicates a second time-frequency resource for a second DMRS, the second time-frequency resource at least partially overlapping the first time-frequency resource, the first information comprising one of first downlink control information (DCI) or first configuration information, and the second information comprising second DCI or second configuration information, wherein each of the first configuration information and the second configuration information is a higher layer signaling; and
discarding the second information when a first condition is met, wherein the first condition comprises at least one of the following conditions:
bandwidth part indication information indicated by the second information is different from bandwidth part indication information indicated by the first information;
antenna port information indicated by the second information is different from antenna port information indicated by the first information; or
DMRS sequence initialization information indicated by the second information is different from DMRS sequence initialization information indicated by the first information.

16. The medium according to claim 15, wherein
the first information comprises the first DCI, the second information comprises the second DCI, and a DCI format identifier in each of the first DCI and the second DCI is 0; or
the first information comprises the first configuration information, the second information comprises the second DCI, a DCI format identifier in the second DCI is 0, and the first configuration information is used to configure uplink transmission without dynamic grant; or the second information comprises the second configuration information, the first information comprises the first DCI, a DCI format identifier in the first DCI is 0, and the second configuration information is used to configure uplink transmission without dynamic grant.

17. The medium according to claim 16, wherein the first condition further comprises at least one of the following conditions:

uplink indication information and supplementary uplink indication information that are indicated by the second information are different from uplink indication information and supplementary uplink indication information that are indicated by the first information;

frequency hopping information indicated by the second information is different from frequency hopping information indicated by the first information;

a phase-tracking reference signal (PTRS)-demodulation reference signal (DMRS) association indicated by the second information is different from a PTRS-DMRS association indicated by the first information;

closed-loop power control indication information indicated by the second information is different from closed-loop power control indication information indicated by the first information; and transform precoder information indicated by the second information is different from transform precoder information indicated by the first information.

18. The medium according to claim 16, wherein the first information is further used to indicate a time domain resource for a first channel, the second information is further used to indicate a time domain resource for a second channel, and the method further comprises:

sending a third channel, wherein the third channel is used to carry configured grant-based uplink transmission, wherein the first condition further comprises at least one of the following conditions:

a time domain resource for the third channel is between the time domain resource for the first channel and the time domain resource for the second channel;

the time domain resource for the third channel partially or completely overlaps the time domain resource for the first channel; and the time domain resource for the third channel partially or completely overlaps the time domain resource for the second channel.

19. The medium according to claim 15, wherein the first information comprises the first DCI, the second information comprises the second DCI, and a DCI format identifier in each of the first DCI and the second DCI is 1; or the first information comprises the first configuration information, the second information comprises the second DCI, a DCI format identifier in the second DCI is 1, and the first configuration information is used to configure semi-persistent scheduling-based downlink transmission; or the second information comprises the second configuration information, the first information comprises the first DCI, a DCI format identifier in the first DCI is 1, and the second configuration information is used to configure semi-persistent scheduling-based downlink transmission.

20. The medium according to claim 19, wherein the first condition further comprises at least one of the following conditions:

transmission configuration indication information indicated by the second information is different from transmission configuration indication information indicated by the first information;

physical resource block bundling size indicator information indicated by the second information is different from physical resource block bundling size indicator information indicated by the first information; and frequency hopping information indicated by the second information is different from frequency hopping information indicated by the first information.

* * * * *